US009207892B2

(12) United States Patent
Kuratomi

(10) Patent No.: US 9,207,892 B2
(45) Date of Patent: Dec. 8, 2015

(54) PRINT SYSTEM, PRINTING METHOD, AND COMPUTER-READABLE RECORDING MEDIUM STORING PRINT PROGRAM

(71) Applicant: KONICA MINOLTA, INC., Tokyo (JP)

(72) Inventor: Shinya Kuratomi, Atsugi (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 14/483,079

(22) Filed: Sep. 10, 2014

(65) Prior Publication Data
US 2015/0077778 A1 Mar. 19, 2015

(30) Foreign Application Priority Data
Sep. 17, 2013 (JP) ................................. 2013-192449

(51) Int. Cl.
G06F 3/12 (2006.01)
(52) U.S. Cl.
CPC ............ *G06F 3/1247* (2013.01); *G06F 3/1211* (2013.01); *G06F 3/1288* (2013.01)
(58) Field of Classification Search
None
See application file for complete search history.

(56) References Cited

U.S. PATENT DOCUMENTS

| 6,816,276 | B2* | 11/2004 | Sugano ........................ 358/1.15 |
| 7,782,491 | B2* | 8/2010 | Ishizuka ........................ 358/2.1 |
| 7,812,980 | B2* | 10/2010 | Matsubara ................... 358/1.13 |
| 8,120,813 | B2* | 2/2012 | Matsubara et al. ............ 358/1.9 |
| 8,279,487 | B2* | 10/2012 | Cain .............................. 358/1.9 |
| 8,867,065 | B2* | 10/2014 | Klassen ....................... 358/1.15 |
| 9,052,854 | B2* | 6/2015 | Klassen et al. ........................ 1/1 |
| 2003/0193683 | A1* | 10/2003 | Motamed et al. ............ 358/1.13 |
| 2006/0033956 | A1* | 2/2006 | Takahashi .................... 358/1.15 |
| 2006/0268318 | A1* | 11/2006 | Lofthus et al. ............... 358/1.15 |
| 2007/0229860 | A1* | 10/2007 | Matsubara et al. ............ 358/1.9 |
| 2008/0204774 | A1* | 8/2008 | Matsushima .................. 358/1.9 |
| 2009/0180143 | A1* | 7/2009 | Kurahashi et al. .......... 358/1.15 |
| 2010/0103444 | A1* | 4/2010 | Farrell et al. ................ 358/1.15 |
| 2011/0122433 | A1* | 5/2011 | Klassen ....................... 358/1.15 |
| 2013/0342858 | A1* | 12/2013 | Abel et al. .................... 358/1.9 |

FOREIGN PATENT DOCUMENTS

| JP | 6-139032 | 5/1994 |
| JP | 10-289079 | 10/1998 |
| JP | 2003-39779 | 2/2003 |
| JP | 2005-352691 | 12/2005 |
| JP | 2007-310450 | 11/2007 |

OTHER PUBLICATIONS

Notification of Reason for Refusal from JPO for appl. No. 2013-192449, dispatched Sep. 8, 2015, 3 pgs.
Translation of the Notification of Reason for Refusal from JPO for appl. No. 2013-192449, dispatched Sep. 8, 2015, 3 pgs.

* cited by examiner

*Primary Examiner* — Dung Tran
(74) *Attorney, Agent, or Firm* — Squire Patton Boggs (US) LLP

(57) ABSTRACT

Provided is a print system which analyzes a print job to generate analysis result information, generating an image for printing by performing an RIP process by using an image generating function required for each object for drawing in each page belonging to the print job based on the analysis result information. In turn, the print system synthesizes an image for printing of each object into a page image based on the analysis result information and prints the page image.

17 Claims, 21 Drawing Sheets

| Image generating function | IP address of image generation server device | Data reception port number |
|---|---|---|
| Image generating function 1 | XX.XX.XXX.XXX | XXXX |
| Image generating function 2 | XX.XX.XXX.XXX | XXXX |
| ... | ... | ... |
| Image generating function n | XX.XX.XXX.XXX | XXXX |

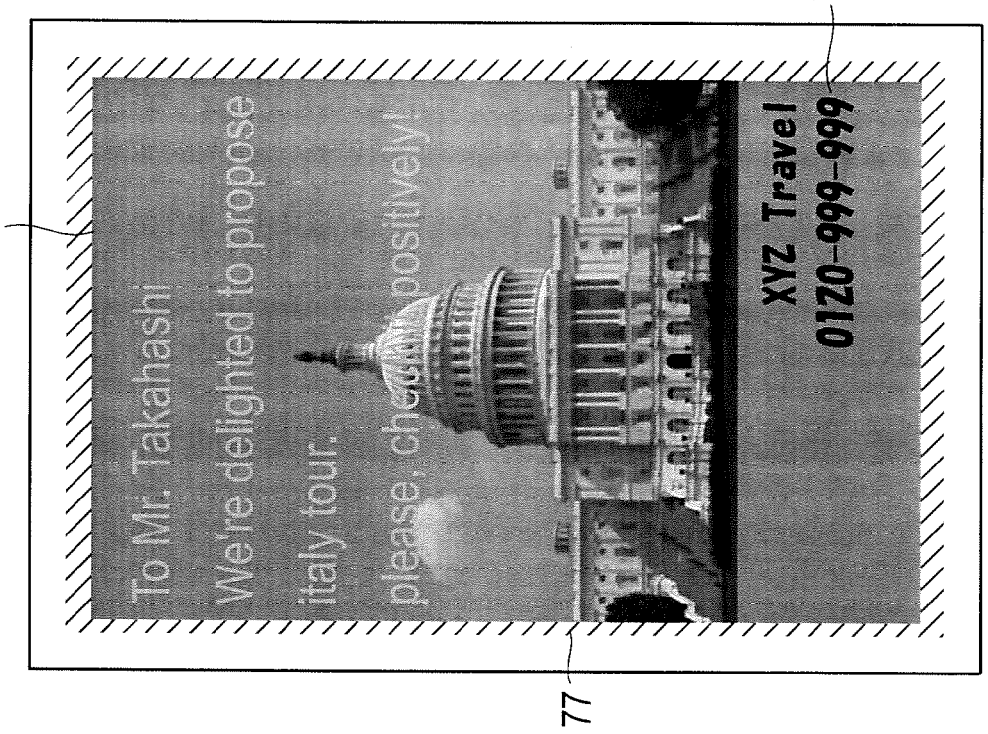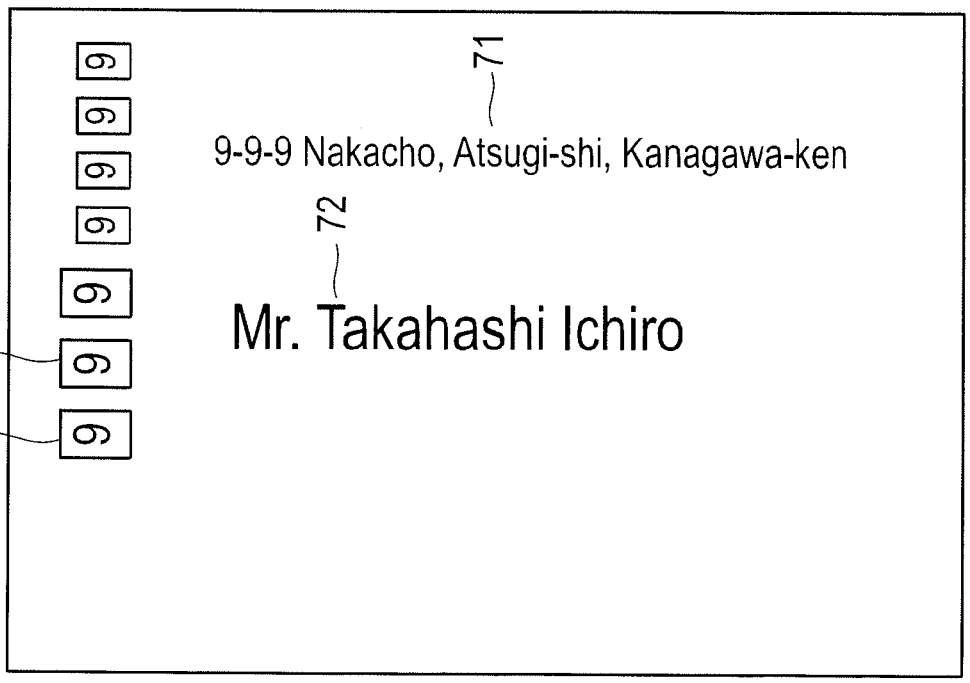
FIG.14

FIG.15

| Job number | Page number (PPML) | Object number (PPML) | Page number (PDF) | Cutting-out rectangle information (PDF) | Arrangement position | Type of object | IP address and port number of return destination |
|---|---|---|---|---|---|---|---|
| 60 | 1 | 1 | 1 | x11,y11,x12,y12 | x1,y1 | Monochrome | XX.XXX.XXX.XX XXXX |
| | | 2 | 2 | x21,y21,x22,y22 | x2,y2 | Monochrome | |
| | | 3 | 3 | x31,y31,x32,y32 | x3,y3 | Monochrome | |
| | | 4 | 4 | x41,y41,x42,y42 | x4,y4 | Color (absence of transparence effect) | |
| | 2 | 1 | 5 | x51,y51,x52,y52 | x5,y5 | Color (presence of transparence effect) | |
| | | 2 | 6 | x61,y61,x62,y62 | x6,y6 | Color (absence of transparence effect) | |
| | | 3 | 7 | x71,y71,x72,y72 | x7,y7 | Color (absence of transparence effect) | |

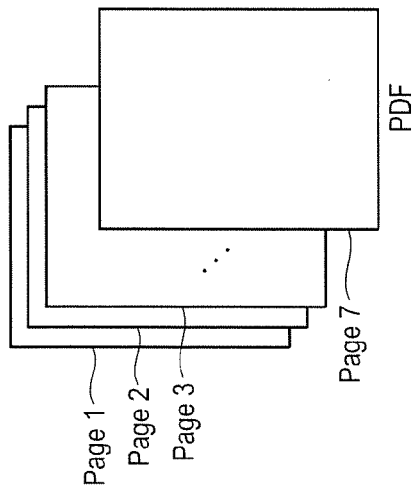

| Job number | Page number (PPML) | Object number (PPML) | Page number (PDF) | Cutting-out rectangle information (PDF) | Aarrangement position | Type of image generating function | IP address and port number of return destination |
|---|---|---|---|---|---|---|---|
| 60 | 1 | 1 | 1 | x11,y11,x12,y12 | x1,y1 | Monochrome | XX.XXX.XXX.XX XXXX |

Page 1 — PDF

FIG.17

| Job number | Page number (PPML) | Object number (PPML) |
|---|---|---|
| 60 | 1 | 1 |

9-9-9 Nakacho, Atsugi-shi, Kanagawa-ken

FIG.24

| Job number | Type of job | Total page number | State | Paper-output tray |
|---|---|---|---|---|
| 62 | — | — | Receiving | — |
| 61 | PPML | 560 | Printing | S |
| 60 | PPML | 1500 | Printing | Standard tray |
| 59 | PS | 235 | Completed | Standard tray |

PRINT SYSTEM, PRINTING METHOD, AND COMPUTER-READABLE RECORDING MEDIUM STORING PRINT PROGRAM

CROSS-REFERENCE TO RELATED APPLICATION

This application is based on Japanese Patent Application No. 2013-192449filed on Sep. 17, 2013, the contents of which are incorporated herein by reference.

BACKGROUND

1. Technical Field

The present invention relates to a print system, a printing method, and a computer-readable recording medium storing a print program capable of reducing a total process time of printing.

2. Description of Related Art

In a print device such as an electro-photographic printer, print data described using a Page Description Language (PDL) is converted into a bitmap image (raster image) by a Raster Image Processing (RIP) process or the like. The RIP process is executed by a printer controller incorporated in the print device. The print device forms a bitmap image as a real image on a paper medium. The image formation is executed by a printer engine incorporated in the print device.

In general, the printer controller is connected to the printer engine in a Point To Point (P2P) manner to perform the RIP process dedicated to the connected printer engine. Therefore, the function of the RIP process by the printer controller is also set in a fixed manner in accordance with a function of the printer engine. For example, the printer controller connected to the printer engine supporting color printing performs the RIP process (hereinafter, referred to as color RIP) corresponding to the color printing in a fixed manner. The printer controller connected to the print engine supporting monochrome printing performs the RIP process (hereinafter, referred to as monochrome RIP) corresponding to the monochrome printing in a fixed manner.

However, if the RIP process is in a fixed manner, in some cases, the RIP process may be excessive or function-mismatched depending on print data.

For example, in the case where the printer controller has a function of the color RIP, even when the print data includes object data which can be processed by the monochrome RIP, the entire print data are processed by the color RIP in a fixed manner. In this case, the function is excessive. On the contrary, in the case where the printer controller has a function of the monochrome RIP, even when the print data includes object data which are to be processed by the color RIP, the entire print data are processed by the monochrome RIP in a fixed manner. In this case, the function is mismatched.

Therefore, for example, Japanese Patent Application Laid-Open No. 10-289079 proposes a technique where, in the case where different types of object data are mixed in the print data, the object data are assigned to a plurality of print devices having different RIP functions, and RIP processes corresponding to the types of the object data are performed.

However, in the invention disclosed in Japanese Patent Application Laid-Open No. 10-289079, the plurality of the print devices separately performs the RIP processes on the object data and separately retains RIP-performed raster data. For this reason, during printing, by passing one paper sheet through all the print devices which perform the RIP processes, printing of the object needs to be repeated one by one. In other words, printing needs to be performed on the same paper sheet several times. Therefore, if there are many types of the object data included in the print data, the printing times are increased. As a result, the total process time of printing becomes long.

SUMMARY

The present invention is achieved in view of the problems described above. Therefore, an object of the present invention is to provide a print system, a printing method, and a computer-readable recording medium storing a print program capable of reducing a total process time of printing.

To achieve at least one of the abovementioned objects, a print system reflecting one aspect of the present invention includes: an analyzing unit which analyzes, from a print job including image data of plural objects for drawings and print setting, arrangement position information of each object for drawing in each page belonging to the print job and an image generating function required for each object for drawing to generate analysis result information; a plurality of image generating units which has different image generating functions and is capable of generating image data for printing from the image data of the objects for drawing; an assigning unit which assigns the image data and the arrangement position information of the objects for drawing to the image generating units having the respective required image generating functions based on the analysis result information; a synthesizing unit which collects the plurality of pieces of image data for printing generated in the plurality of image generating units and the corresponding arrangement position information and synthesizes the image data for printing in units of pages based on the analysis result information to generate a page image; and a printing unit which prints the page image.

In the print system, preferably, there are the plural print jobs, and when the synthesizing unit generates the page image belonging to a preceding print job which is previously analyzed by the analyzing unit, in the case where the image data for printing for generating the page image belonging to a following print job which is analyzed later by the analyzing unit are prepared in the synthesizing unit, the printing unit prints the page image based on a page mixture treatment policy representing that the page image belonging to the preceding print job and the page image belonging to the following print job are not to be physically mixed.

In the print system, preferably, the page mixture treatment policy represents that, after all the page images belonging to the preceding print job are printed, the page image belonging to the following print job is to be printed.

In the print system, preferably, the printing unit includes a plurality of output destinations, and preferably, the page mixture treatment policy represents that the page images are to be printed and output to the different output destinations according to the different print jobs.

In the print system, preferably, a reception screen for receiving designation of the page mixture treatment policy is provided.

Preferably, the print system includes a print device which acquires the print job; and an image generation server device which is able to mutually communicate with the print device, and preferably, the print device includes the printing unit, the image generation server device includes the assigning unit and the plural image generating units, and the analyzing unit and the synthesizing unit are included in any one of the print device and the image generation server device.

In the print system, preferably, there are plural image generation server devices which are able to communicate with each other, and the plural image generating units are included in the different image generation server devices.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 14 is a diagram illustrating an example of a print job;

FIG. 15 is a diagram illustrating an example of analysis result information generated by analyzing the print job of FIG. 14;

FIG. 17 is a diagram illustrating image data for printing generated by an image generation server device and the corresponding arrangement position information;

FIG. 24 is a diagram illustrating an example of a state of progress of processes of each print job in the case where inter-job page mixture occurs.

DETAILED DESCRIPTION

Figure 1:
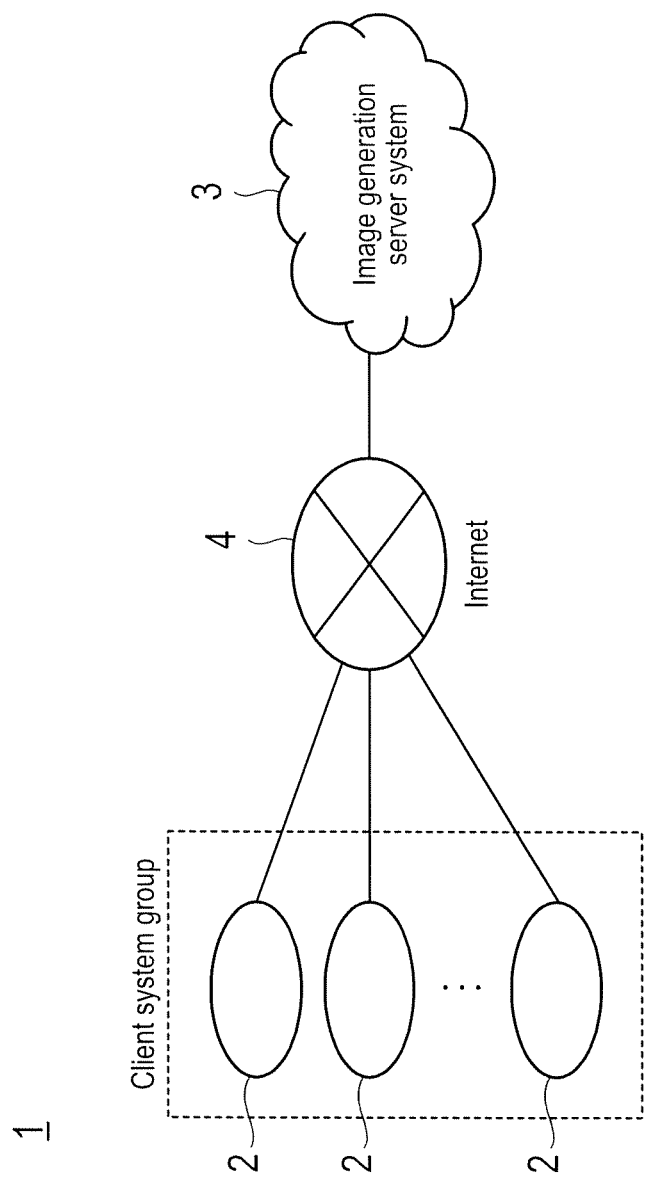
FIG. 1 is a diagram illustrating an overall schematic configuration of a print system according to a first embodiment.

Hereinafter, embodiments of the present invention will be described with reference to the accompanying drawings. In the description of the drawings, the same elements are denoted by the same reference numerals, and redundant description is omitted. In addition, in some cases, dimensional ratios in the drawings are exaggerated and different from actual ratios for convenience of the description.

[First Embodiment]
<Configuration of Print System>

FIG. 1 is a diagram illustrating an overall schematic configuration of a print system according to a first embodiment.

As illustrated in FIG. 1, a print system 1 is configured to include a client system group including a plurality of client systems 2 and an image generation server system 3. Each client system 2 and the image generation server system 3 are connected via the Internet 4 to be able to communicate each other. The image generation server system 3 provides a predetermined service in response to a request from each client system 2. The print system 1 having such a configuration is referred to as a cloud-application print system. The client system 2 and the image generation server system 3 will be described in detail.

Figure 2:
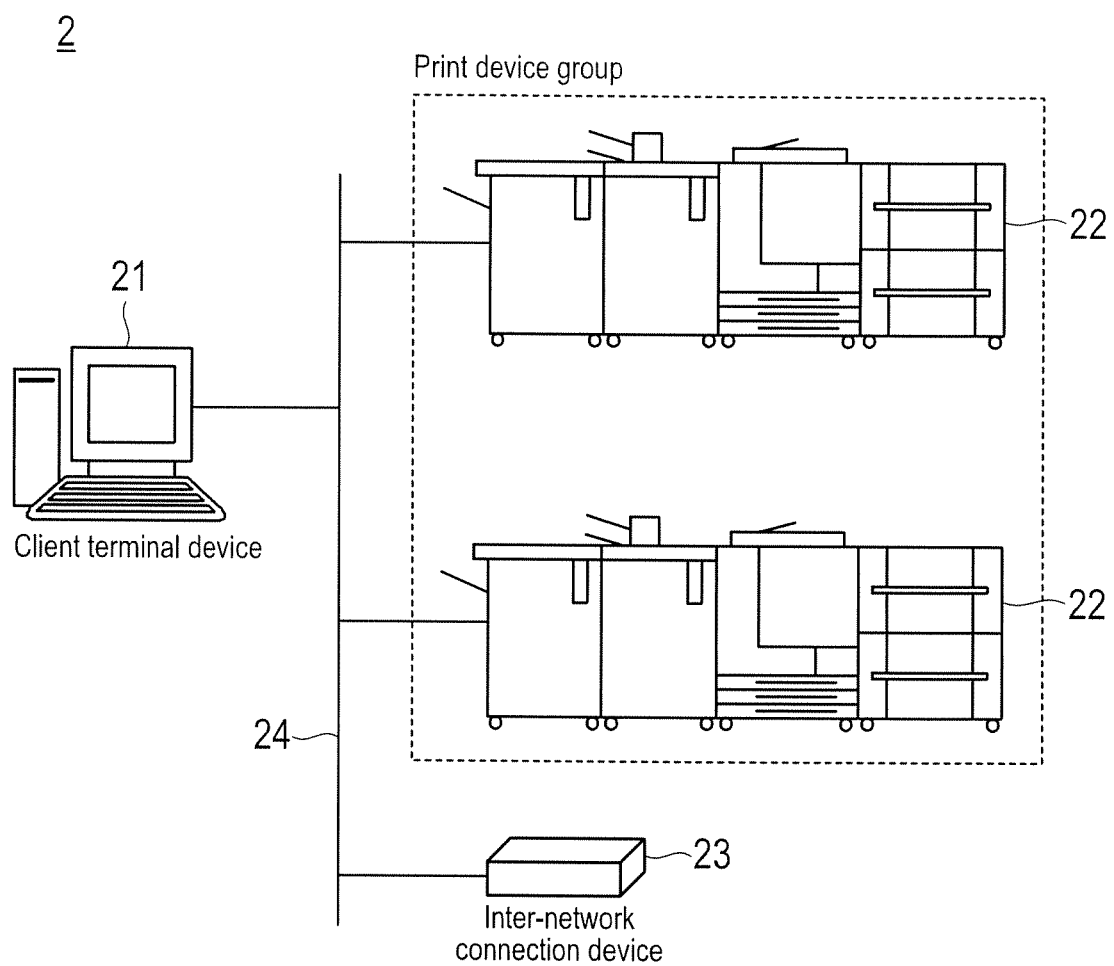
FIG. 2 is a diagram illustrating a schematic configuration of a client system.

FIG. 2 is a diagram illustrating a schematic configuration of the client system.

As illustrated in FIG. 2, the client system 2 is configured to include a client terminal device 21, a print device group including a plurality of print devices 22, and an inter-network connection device 23. The client terminal device 21 and the print devices 22 are connected via a network 24 to be able to communicate each other. The print device 22 is, for example, a Multi-Functional Peripheral (MFP) and prints a print job received from the client terminal device 21 on a paper medium in units of pages. In addition, the client terminal device 21 and the print devices 22 may be directly connected (locally connected) to each other without the network 24. The network 24 is configured with a LAN connecting network devices according to standards such as Ethernet, Token Ring, and FDDI or a WAN connecting LANs with a dedicated line. In addition, the types and number of the devices connected to the network 24 are not limited to the example illustrated in the figure. The network 24 is connected through the inter-network connection device 23 to the Internet 4. Therefore, the print device 22 can use a service provided by the image generation server system 3 via the network 24 and the Internet 4.

Figure 3:
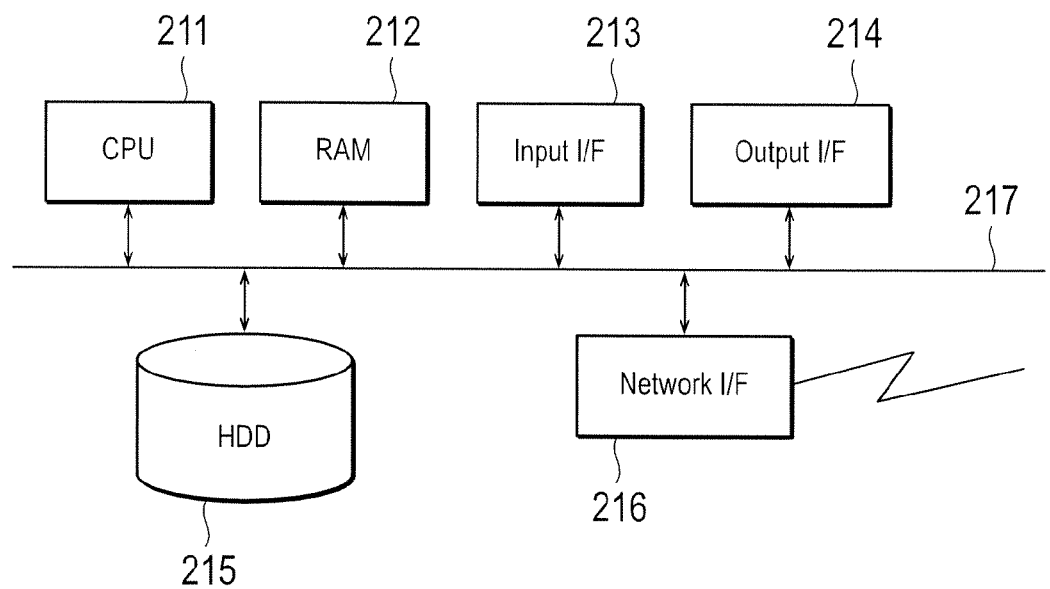
FIG. 3 is a block diagram illustrating an example of a hardware configuration of a client terminal device.

FIG. 3 is a block diagram illustrating an example of a hardware configuration of the client terminal device.

As illustrated in FIG. 3, the client terminal device 21 is configured to include a Central Processing Unit (CPU) 211, a Random Access Memory (RAM) 212, an input I/F 213, an output I/F 214, a Hard Disk Drive (HDD) 215, and a network I/F 216. These components are connected via a system bus 217 to be able to communicate each other.

The CPU 211 loads a program (print job generation program) generating the print job from the HDD 215 on the RAM 212 and executes the program. The print job generation program is generally a Graphical User Interface (GUI) program and edits a content of the print job by using the input I/F 213 such as a keyboard or a pointing device. The edited content of the print job can be checked from the output I/F 214 such as a monitor at any time. In addition, the CPU 211 converts the generated print job into print data described using a page description language and transmits the print data through the network I/F 216 via the network 24 to any one of the print devices 22 in the print device group.

Figure 4:
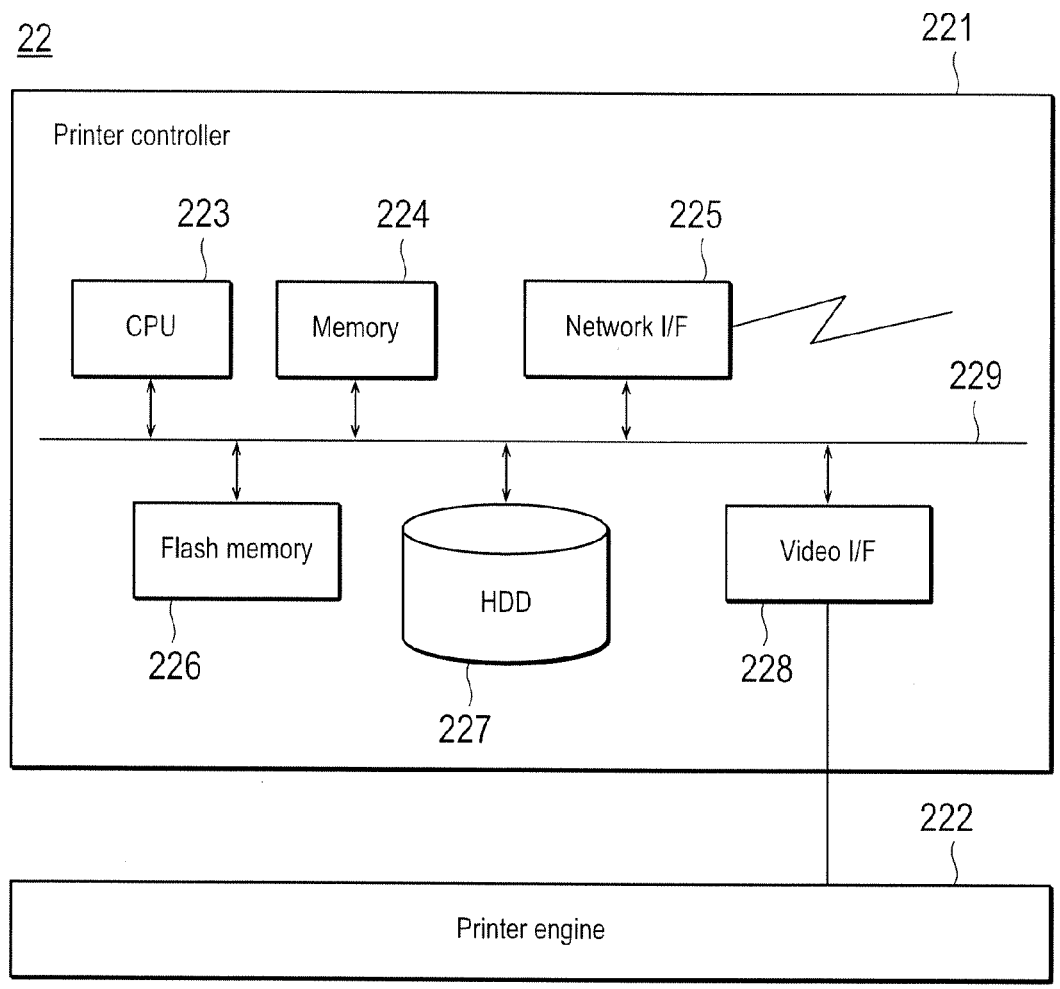
FIG. 4 is a block diagram illustrating an example of a hardware configuration of a print device.
Figure 5:
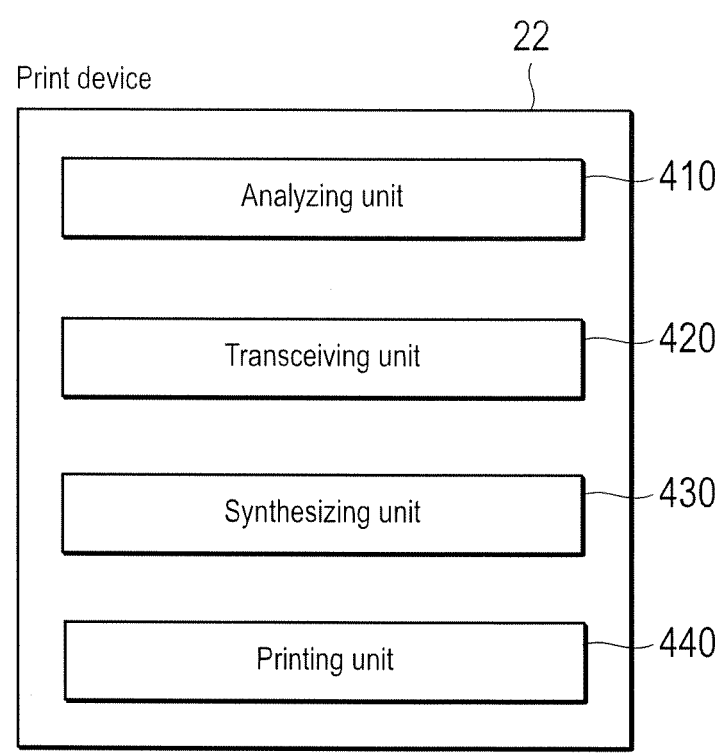
FIG. 5 is a block diagram illustrating an example of a functional configuration of the print device of FIG. 4.

FIG. 4 is a block diagram illustrating an example of a hardware configuration of the print device. FIG. 5 is a block diagram illustrating an example of a functional configuration of the print device of FIG. 4.

First, as illustrated in FIG. 4, the print device 22 is configured to include a printer controller 221 and a printer engine 222. The printer controller 221 transmits, for example, an image for printing generated from the print job received from the client terminal device 21 to the printer engine 222 in units of pages. The printer engine 222 generates a final printed matter by printing the image for printing on the paper medium.

The printer controller 221 is configured to include a CPU 223, a memory 224, a network I/F 225, a flash memory 226, an HDD 227, and a video I/F 228. These components are connected via a system bus 229 to be able to communicate each other.

The CPU 223 is a control circuit configured with a processor or the like which executes controlling the above-described components or various arithmetic processes according to programs, and each function of the printer controller 221 is implemented by allowing the CPU 223 to execute the program corresponding to the function.

The memory 224 is a high-speed-accessible main storage device, as a job area, which temporarily stores programs and data. As the memory 224, for example, a Dynamic Random Access Memory (DRAM), a Synchronous Dynamic Random Access Memory (SDRAM), a Static Random Access Memory (SRAM), or the like may be employed.

The network I/F 225 causes the print devices 22 to connect to the network 24. Therefore, communication between the print devices 22 and the client terminal device 21 and between the print devices 22 and the image generation server system 3 can be implemented.

The flash memory 226 is an auxiliary storage device which stores various programs or temporary data, and the HDD 227 is a large-capacity auxiliary storage device which stores various data. The HDD 227 can store data received through, for example, the network I/F 225. The printer controller 221 transmits the image for printing through the video I/F 228 to the printer engine 222.

The printer engine 222 is a general electro-photographic type printer engine and is configured to include a transport mechanism for a recording sheet, a photosensitive drum, a charging device, a laser unit, a developing device, a cleaning device, a fixing device, and an output destination including a paper-output tray or an output bin.

In addition, although not illustrated, the print device 22 is not intended to exclude other configurations of general print devices such as an MFP. For example, the print device 22 may include an operation panel (not illustrated) which receives user's instruction or displays a state of progress of the print job.

As illustrated in FIG. 5, the print device 22 having the above-described hardware configuration is configured to include, as a functional configuration, an analyzing unit 410, a transceiving unit 420, a synthesizing unit 430, and a printing unit 440. The analyzing unit 410, the transceiving unit 420, the synthesizing unit 430, and the printing unit 440 are implemented by allowing the CPU 223 to read programs stored in the flash memory 226 on the memory 224 and to execute the programs.

The analyzing unit 410 analyzes the print job to generate analysis result information. More specifically, the analyzing unit 410 analyzes arrangement position information of each object for drawing and an image generating function required for each object for drawing in each page belonging to the print job to generate the analysis result information. The analyzing unit 410 analyzes a data structure of the print job described using, for example, a Personalized Print Markup Language (PPML) format and generates the analysis result information.

Figure 6:
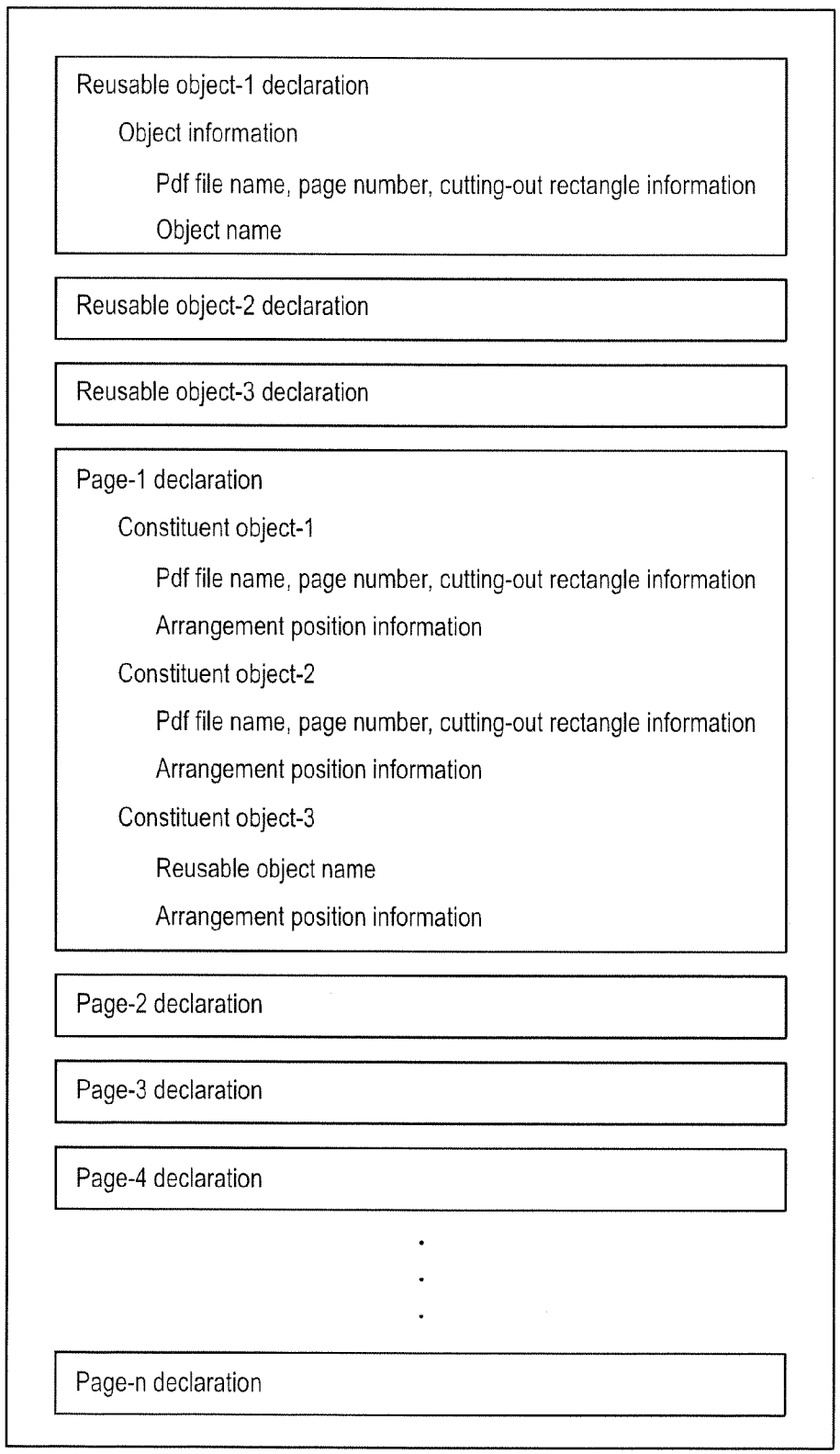
FIG. 6 is a data structure explanation diagram for explaining an example of a data structure of a layout information file included in a PPML-format print job.
Figure 7:
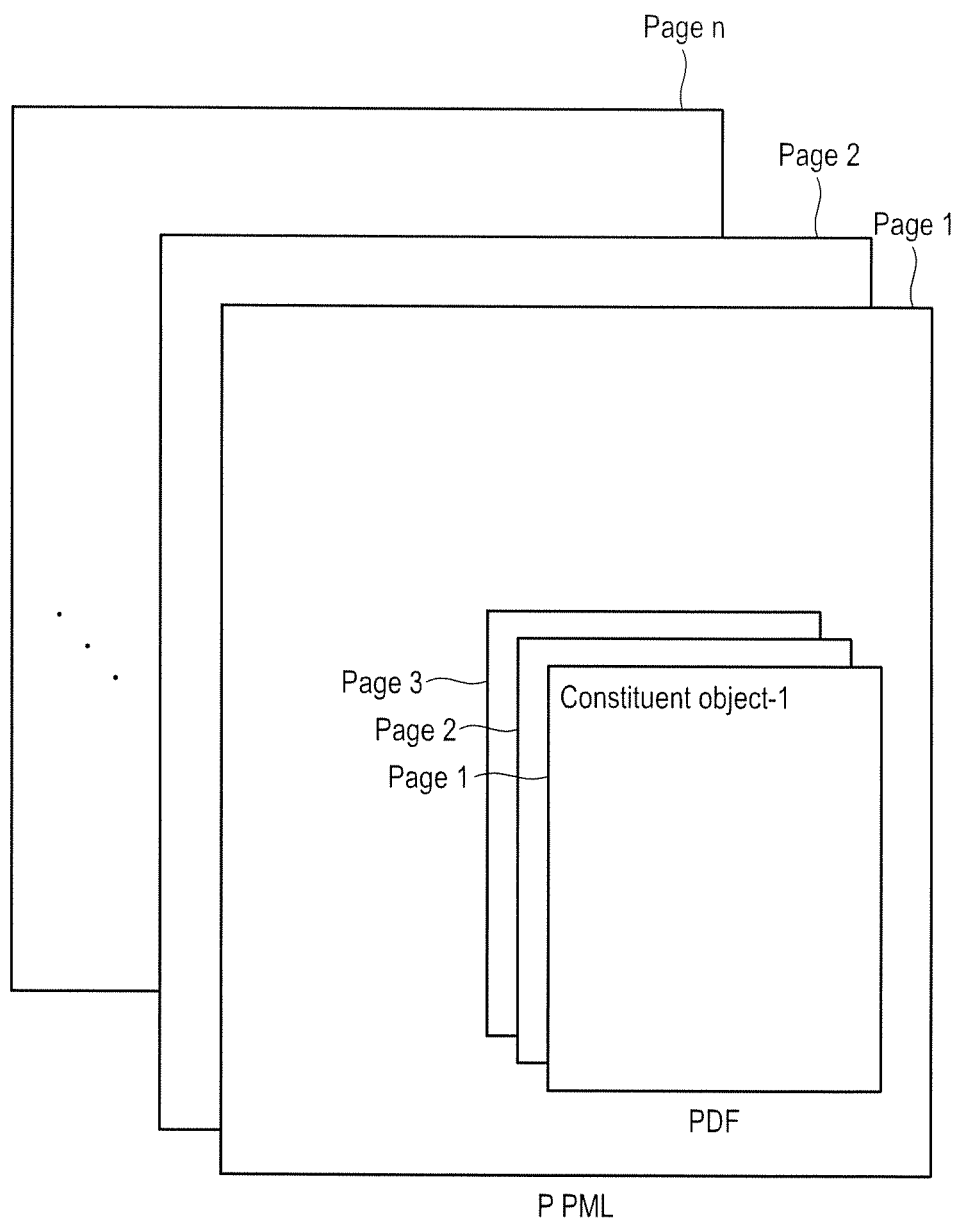
FIG. 7 is a conceptual diagram illustrating an image of a page configuration of a PPML-format print job.

FIG. 6 is a data structure explanation diagram for explaining an example of a data structure of a layout information file included in a PPML-format print job. FIG. 7 is a conceptual diagram illustrating an image of a page configuration of the PPML-format print job.

A typical PPML-format print job includes two types of files such as a PDF file (sometimes referred to as PDF data) and a layout information file (sometime referred to as PPML data). The PDF data includes entities of image data of objects for drawing. In the PPML data, layout information on each object for drawing in each page is described. In addition, generally, these data are compressed by ZIP to be input to the print device 22.

As illustrated in FIG. 6, generally, declarations of reusable objects, which are objects referred to and used in plural page, are described in a header of the PPML data. Object information, for example, a PDF file name, a page number, cutting-out rectangle information, and an object name are described in the declaration of the reusable object. In the example illustrated in FIG. 6, declarations of three reusable objects are described.

Following the declarations of the reusable objects, page declarations of respective pages belonging to the associated print job are described. In page declaration, constituent objects constituting the associated page are described. The constituent objects are classified into two types of local objects used for only the associated page and reference declaration for the reusable objects. In the former, for example, a PDF file name, a page number, cutting-out rectangle information, and arrangement position information are described, and in the latter, for example, reusable object name information and arrangement position information are described. In the example illustrated in FIG. 6, two local objects and one reusable object reference declaration are described in the declaration of the page 1.

Typically, as illustrated in FIG. 7, the PDF data that are entities of image data of objects for drawing are configured in units of constituent objects. Namely, one object for drawing is retained in one page of the PDF data. Therefore, the PDF data of which number of pages are the same as the number of constituent objects constituting the PPML page are included in one page of the PPML data. In addition, the print setting which is set by the client terminal device 21 side at the time of generating and editing the objects for drawing is retained in the PDF data. For example, the print setting such as a drawing color or an opacity of the object for drawing is retained.

In addition, the format of the page description of the print job is not limited to the above-described PPML format, but any format described in units of objects may be used. In the PPML format, since the reusable object is treated in distinction from other objects, by performing only one RIP process on the reusable object, the reusable object can be used as it is without performing the RIP process again on the other pages. Therefore, similarly to a variable print job, in the case where image data of the object for drawing common to the pages are included, it is possible to further reduce the total process time of the print job.

Details of the process of generating analysis result information from the print job by the analyzing unit 410 will be described later.

The transceiving unit 420 communicates with the client terminal device 21 and the image generation server system 3. More specifically, the transceiving unit 420 generates an image generation request packet from the print job received from the client terminal device 21 and transmits the image generation request packet to the image generation server system 3. In addition, the transceiving unit 420 receives a response packet generated by the image generation server system 3. In addition, the transceiving unit 420 can transmit a processing result of the print job to the client terminal device 21. The image generation request packet is a packet requesting for generating an image for printing from request data including the analysis result information of the print job analyzed by the analyzing unit 410 and the PDF data. The response packet as a packet responding to the image generation request packet is a packet including the image for printing generated based on the request data by the image generation server system 3.

The synthesizing unit 430 synthesizes a page image which is to be printed on the paper medium. More specifically, the synthesizing unit 430 collects the image data for printing included in the response packet from the image generation server system 3 and the corresponding arrangement position information and generates the page image by synthesizing the image data for printing in units of pages of printing based on the analysis result information.

The printing unit 440 transmits the page image generated by the synthesizing unit 430 to the printer engine 222 and allows the printer engine 222 to print the page image on the paper medium.

The print device 22 having the above-described configuration analyses the print job received from the client terminal device 21 and transmits the analysis result information and the image data of the plural objects for drawing to the image generation server system 3. Next, the print device 22 collects the image data for printing returned from the image generation server system 3 and the corresponding arrangement position information and generates the page image in units of pages based on the analysis result information to perform printing.

Figure 8:
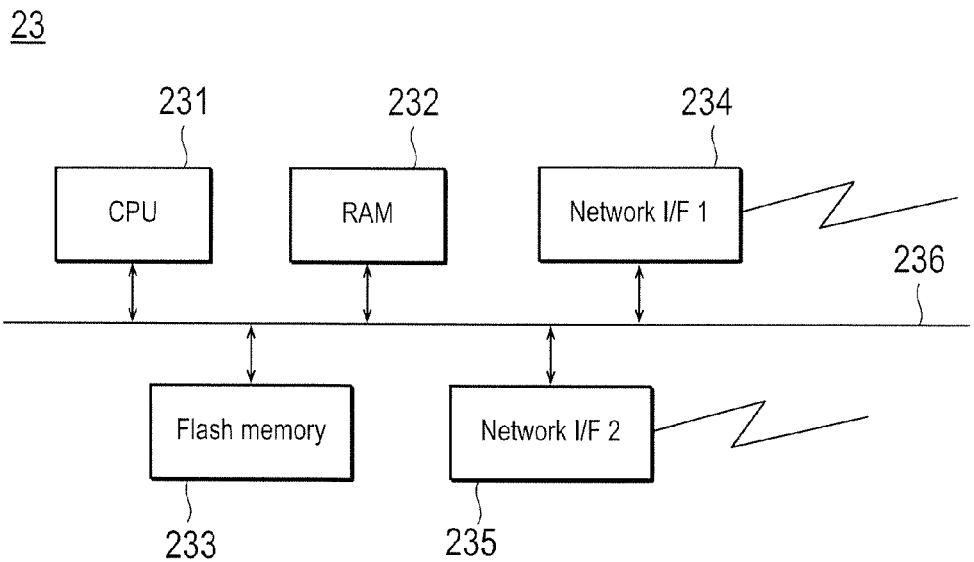
FIG. 8 is a block diagram illustrating an example of a hardware configuration of an inter-network connection device.

FIG. 8 is a block diagram illustrating an example of a hardware configuration of the inter-network connection device.

As illustrated in FIG. 8, the inter-network connection device 23 is configured to include a CPU 231, a RAM 232, a flash memory 233, a network I/F 234, and a network I/F 235. These components are connected via a system bus 236 to be able to communicate each other.

The CPU 231 loads a program for transmitting a network packet (packet transmission program) from the flash memory 233 on the RAM 232 and executes the program. In addition, the CPU 231 transmits a packet received from the one of the network I/F 234 and the network I/F 235 to the other based on routing information stored in the RAM 232.

Figure 9:
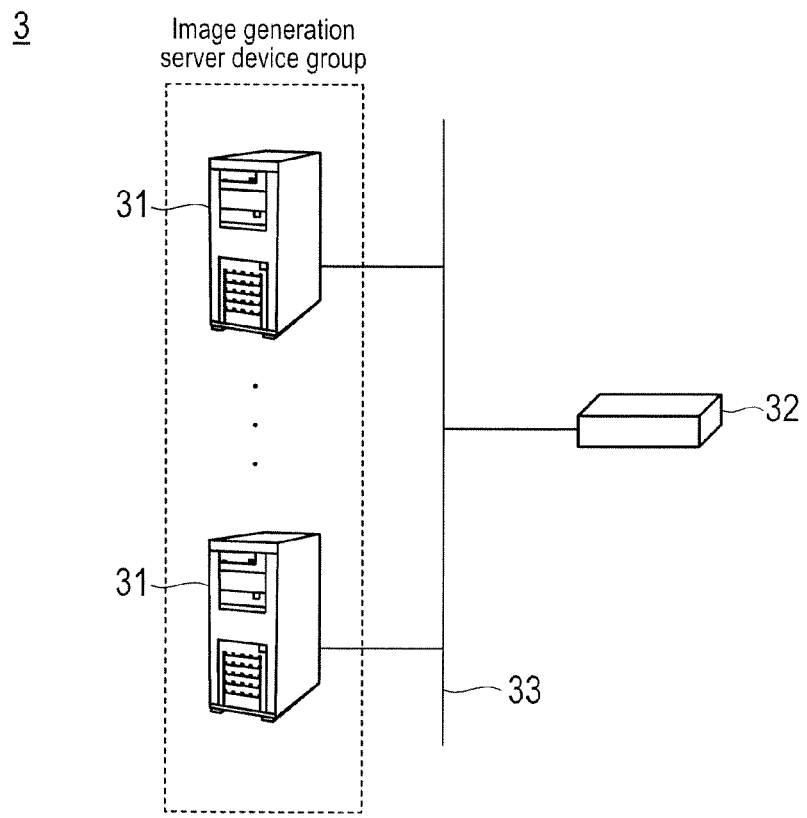
FIG. 9 is a diagram illustrating a schematic configuration of an image generation server system.
Figures 10, 11:
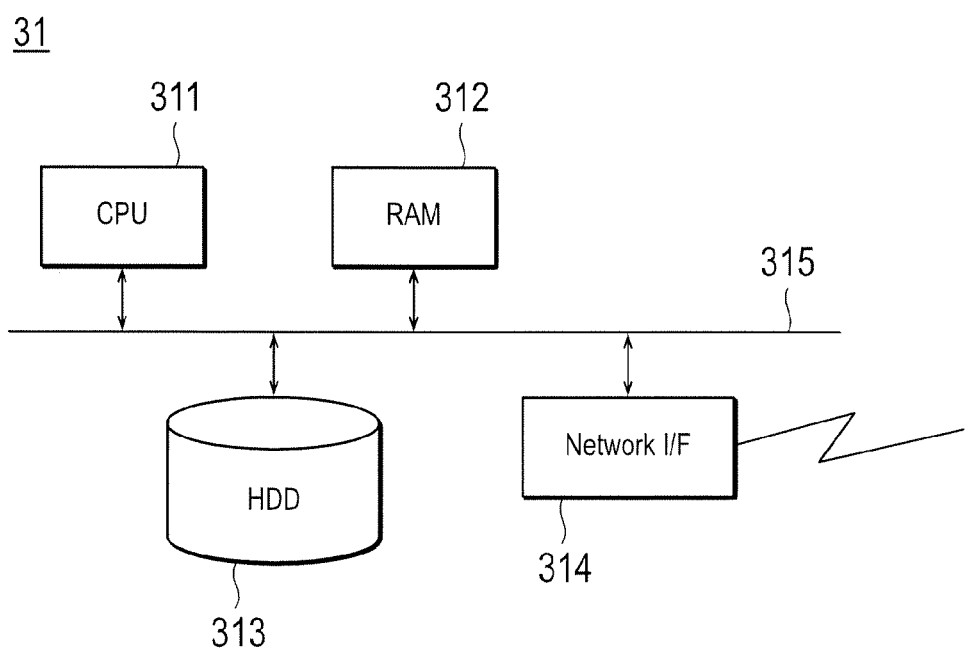
FIG. 10 is a diagram illustrating an image generating function of each image generation server device in an image generation server device group of FIG. 9.
FIG. 11 is a block diagram illustrating an example of a hardware configuration of an image generation server device.

FIG. 9 is a diagram illustrating a schematic configuration of the image generation server system. FIG. 10 is a diagram illustrating an image generating function of each image generation server device in the image generation server device group of FIG. 9.

Firstly, as illustrated in FIG. 9, the image generation server system 3 is configured to include an image generation server device group including a plurality of image generation server devices 31 and an inter-network connection device 32. The plural image generation server devices 31 are connected via a network 33 to be able to communicate each other. The network 33 is connected through an inter-network connection device 32 to the Internet 40. Therefore, each image generation server device 31 can provide a service of image generation via the network 33 and the Internet 4 in response to a request from the print device 22. Since the inter-network connection device 32 has the same configuration as that of the inter-network connection device 23 in the client system 2 illustrated in FIG. 2, and the detailed description thereof is omitted.

As illustrated in FIG. 10, each image generation server device 31 has a different image generating function. In the example of FIG. 10, image generating functions, IP addresses in the network 4, and data reception port numbers of the image generation server devices 31 are described in a correspondence manner in a table format. The image generating function table is retained in the image generation server device 31.

Figure 12:
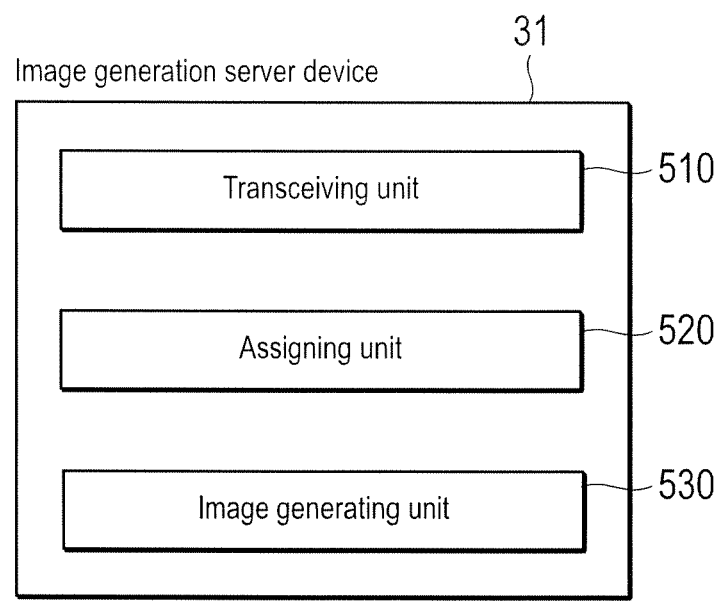
FIG. 12 is a diagram illustrating an example of a functional configuration of the image generation server device of FIG. 11.

FIG. 11 is a block diagram illustrating an example of a hardware configuration of the image generation server device. FIG. 12 is a diagram illustrating an example of a functional configuration of the image generation server device of FIG. 11.

Firstly, as illustrated in FIG. 11, the image generation server device 31 is configured to include a CPU 311, a RAM 312, an HDD 313, and a network I/F 314. These components are connected via a system bus 315 to be able to communicate each other.

The CPU 311 is a control circuit configured with a processor or the like which executes controlling the above-described components or various arithmetic processes according to programs, and each function of the image generation server device 31 is implemented by allowing the CPU 311 to execute the program corresponding to the function.

The RAM 312 is a main storage device which is directly accessible by the CPU 311 and stores various programs and various data. The HDD 313 is a large-capacity auxiliary storage device which stores various programs and various data. The network I/F 314 causes the image generation server device 31 to connect to the network 33.

As illustrated in FIG. 12, the image generation server device 31 having the above-described hardware configuration is configured to include, as a functional configuration, a transceiving unit 510, an assigning unit 520, and an image generating unit 530. The transceiving unit 510, the assigning unit 520, and the image generating unit 530 are implemented by allowing the CPU 311 to read programs stored in the HDD 313 on the RAM 312 and to execute the programs.

The transceiving unit 510 communicates with the print devices 22 each other. More specifically, the transceiving unit 510 receives an image generation request packet from the print device 22 and generates a response packet from image data for printing generated based on the image generation request and the corresponding arrangement position information to respond to the print device 22. In addition, the transceiving unit 510 can also communicate data with other image generation server devices 31.

The assigning unit 520 assigns the data included in the image generation request packet received from the print device 22 to data for image generation of the own device and data for image generation of the other image generation server devices 31 with reference to the image generating function table illustrated in FIG. 10. More specifically, the assigning unit 520 assigns the analysis result information and the image data of the objects for drawing from the print device 22 to the image generating units 530 in units of objects.

The image generating unit 530 generates image data for printing from the data assigned to the own device by the assigning unit 520. More specifically, the image generating unit 530 generates the image data for printing from the image data of the object for drawings assigned to the own device by the image generating function of the own device. Next, the image generating unit 530 extracts the arrangement position information from the analysis result information assigned to the own device.

Herein, in an actual process, the plural image generation server devices 31 can be divided into and operated as one master image generation server device and other slave image generation server devices according to functions thereof. For example, the image generation server device 31 which directly receives the image generation request packet from the print device 22 may be a master image generation server device. In this case, the assigning unit 520 operates only in the master image generation server device, but it does not operate in the slave image generation server devices.

The image generation server system 3 having above-described configuration receives the image generation request packet from the print device 22 and assigns the image of the object for drawing to the image generation server devices 31 having the respective required image generating functions. Next, each image generation server device 31 generates the image data for printing from the image data of the object for drawing assigned to the own device and returns the image data for printing to the print device 22.

<Operations of Print System>

Next, operations of the print system 1 will be described. More specifically, the procedure of the processes of the print device 22 acquiring the print job, the image generation server system 3 generating the image data for printing, and finally, the print device 22 synthesizing the image data for printing to perform printing on the paper medium will be described in detail.

Figure 13:
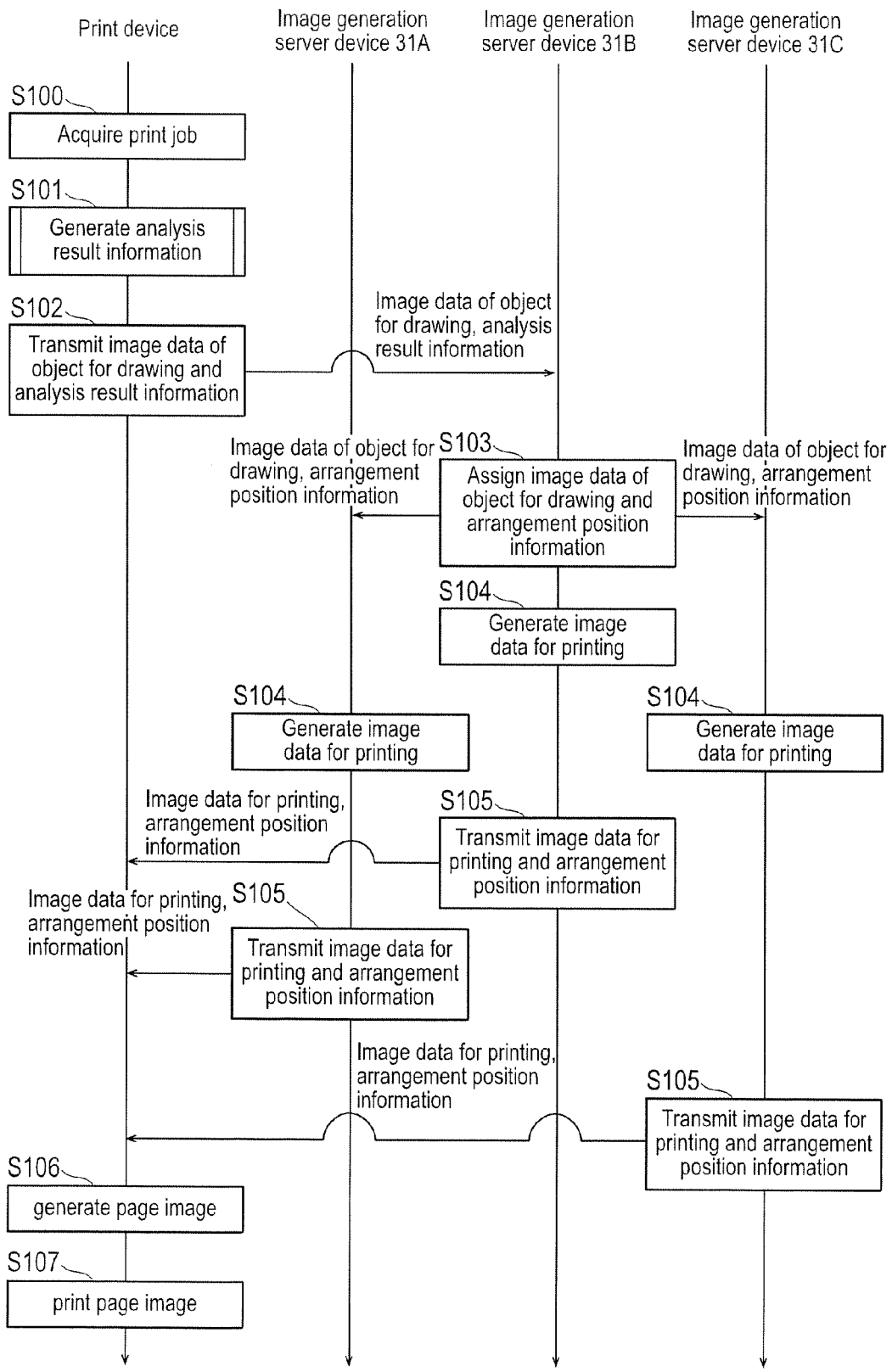
FIG. 13 is a sequence diagram for explaining operations of the print system according to the first embodiment.
Figure 16:
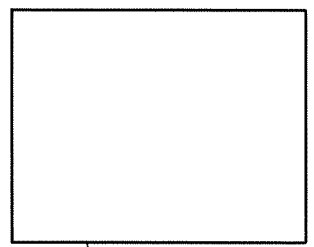
FIG. 16 is a diagram illustrating image data of an object for drawing assigned to image generation server devices and the corresponding analysis result information.
Figure 18:
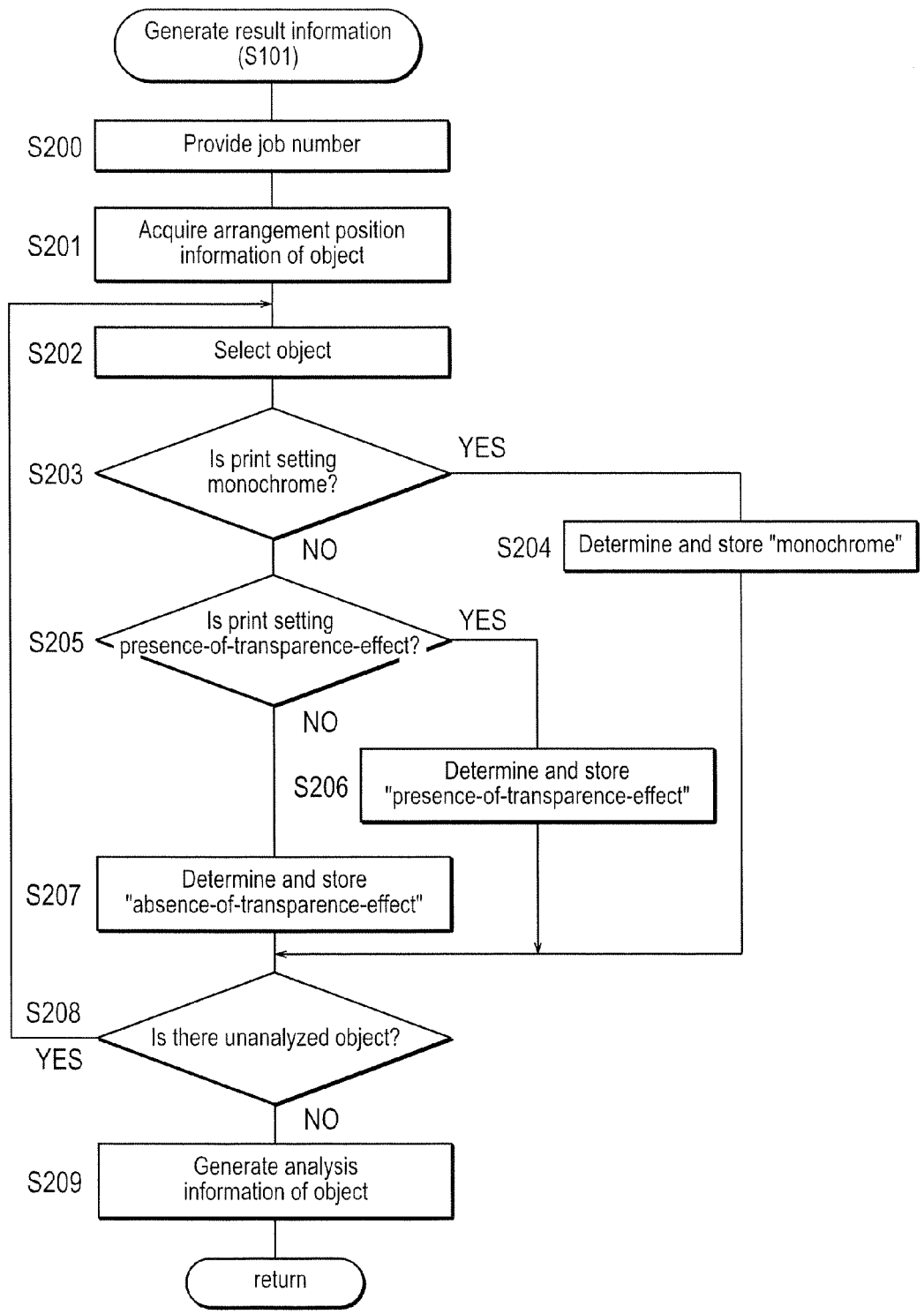
FIG. 18 is a flowchart illustrating an example of a specific process procedure of an analysis result information generating process of FIG. 13.

FIG. 13 is a sequence diagram for explaining the operations of the print system according to the first embodiment. FIG. 14 is a diagram illustrating an example of a print job. FIG. 15 is a diagram illustrating an example of the analysis result information generated by analyzing the print job of FIG. 14. FIG. 16 is a diagram illustrating image data of an object for drawing assigned to each image generation server device and the corresponding analysis result information. FIG. 17 is a diagram illustrating image data for printing generated by the image generation server device and the corresponding arrangement position information. FIG. 18 is a flowchart illustrating an example of a specific process procedure of the analysis result information generating process of FIG. 13.

Hereinafter, as an example, the image generation server system 3 is configured to include three image generation server devices 31A to 31C. The print job is assumed to be described in a page description language in the PPML format illustrated in FIG. 6. In addition, in FIG. 13, the image generation server device 31B is set to be a master image generation server device, and the image generation server devices 31A and 31C are set to be slave image generation server devices.

The operations of the print system 1 can be implemented by allowing the CPU 223 of the print device 22 to execute a print job analyzing/synthesizing program and allowing the CPU 311 of the image generation server device 31 to execute the image generation program. In addition, the CPU 223 and the CPU 311 can operate in an asynchronous manner.

Hereinafter, the operations of the print system 1 will be described in detail with reference to FIGS. 13 to 18.

(Step S100)

The print device 22 acquires a print job. More specifically, the print device 22 receives the print job from the client terminal device 21 and stores the PPML data included in the print job and the PDF data generally configured with plural pages in the HDD 227. In addition, in the case where the acquired print job is compressed data, the print device 22 decompresses the compressed data to acquire the PPML data and the PDF data generally configured with plural pages.

The print device 22 receives a print job for acquiring a printed matter illustrated in, for example, FIG. 14 from the client terminal device 21. The print job for the printed matter illustrated in FIG. 14 is, for example, a print job for variable printing. In the variable printing, for example, some parts such as receiver's name or destination address are set to be variable parts, and other parts such as background image or sender are set to be common parts. While changing contents of the variable parts, printing of plural sheets is performed. In the example of the variable printing illustrated in FIG. 14, in a postcard where a scenery image is drawn in advance on the rear surface, address 71, name, 72, zip code 73, and zip code frame 74 are printed on the front surface, and tour guide information 75, sender information 76, and outer frame 77 are printed on the rear surface. In the print job, the address 71, the name 72, and the zip code 73 printed on the front surface are variable character data edited in single black color, and the zip code frame 74 is figure data edited with an opacity of 100% in color. In addition, the sender information 76 and the outer frame 77 printed on the rear surface are character data and figure data edited with an opacity of 100% in color, and the tour guide information 75 is character data edited with a certain opacity (for example, 50%) in color. The attributes of color, opacity, and the like in the object data are set when the print job is generated and edited in the client terminal device 21 side, and the attributes are retained in the PDF data as the print setting for the objects. In this manner, the print device 22 prints the four objects 71 to 74 on the front surface and the three objects 75 to 77 on the rear surface as the print job. In addition, in the case of the PPML-format print job, the PPML data where the declarations of the above-described seven constituent objects are described and the seven pages of the PDF data which are the entities of the image data of the seven constituent objects are included in the print job. The seven pages of the PDF data are included in the two PPML pages so as to correspond to the two surfaces of the postcard. The print device 22 stores the PPML data and the PFD data in the HDD 227.

(Step S101)

The print device 22 generates the analysis result information. More specifically, the print device 22 analyzes the image generating function, the arrangement position information, and the like required for each constituent object constituting each PPML page from the PPML data and the plural PDF data to generate the analysis result information.

The print device 22 analyzes, for example, the print job to generate the analysis result information illustrated in FIG. 15. A job number of the print job, a PPML page number included in the print job, an object number of each object in each PPML page, and a PDF page number constituting the PDF data are described in the analysis result information. In addition, designated cutting-out rectangle information which is cut out (clipped) from each PDF data to be used as a page component, arrangement position of each constituent object in the PPML page and required image generating function, and return destination are described in the analysis result information. Herein, the image generating function required for processing each constituent object is determined by the print device 22 analyzing the respective PDF data and the printing setting or the like of the constituent object. Details of the analysis result information generating process will be described later.

(Step S102)

The print device 22 transmits the analysis result information and the plural PDF data to the image generation server system 3. More specifically, the print device 22 transmits the image generation request packet including the analysis result information and the plural PDF data to the master image generation server device in the image generation server device group. The print device 22 sets, for example, the image generation server device 31B as a master image generation server device and transmits the request data including the analysis result information and the plural PDF data illustrated in FIG. 15 to the image generation server device 31B.

(Step S103)

The image generation server device 31B assigns the PDF data and the corresponding analysis result information to the image generation server devices 31A, 31B (own), and 31C having the respective required image generating functions based on the request data received from the print device 22. More specifically, the image generation server device 31B cuts out, extracts, assigns the corresponding PDF data and the analysis result information to the image generation server devices 31A, 31B, and 31C having the image generating functions required for each constituent object with reference to the image generating function table illustrated in FIG. 10.

For example, the image generation server device 31B cuts out and extracts the PDF data of which the PDF page number is one as illustrated in FIG. 16 and the corresponding analysis result information from the request data. Next, the image generation server device 31B assigns the cut-out, extracted PDF data and the corresponding analysis result information to any one of the image generation server devices 31A to 31C. Herein, the image generating functions of the image generation server devices 31A to 31C are defined to be "monochrome", "color/absence-of-transparence-effect", and "color/presence-of-transparence-effect", respectively. Therefore, since the image generating function required for the object of FIG. 16 is "monochrome", the image generation server device 31B assigns the cut-out, extracted PDF data and the corresponding analysis result information to the image generation server device 31A. Similarly, the image generation server device 31B assigns the PDF data of which the PDF page numbers of FIG. 15 are two to seven and the corresponding analysis result information to the image generation server devices 31A to 31C having the corresponding image generating functions.

(Step S104)

The image generation server devices 31A to 31C generate the image data for printing. More specifically, the image generation server devices 31A to 31C generate the image data for printing by performing the RIP processes on the objects included in the PDF data based on the PDF data assigned to the own devices. For example, the image generation server device 31A generates the image data for printing illustrated in FIG. 17 by performing the RIP process on the PDF data assigned to the own device of which the PDF page number illustrated in FIG. 16 is one. In addition, since the RIP process itself of generating the image data for printing from the image data of the object for drawing is a well-known technique, the detailed description thereof is omitted.

(Step S105)

The image generation server devices 31A to 31C generate the response packets from the image data for printing and the arrangement position information corresponding to the image data for printing and transmit the response packets to the print device 22. More specifically, the image generation server devices 31A to 31C extract a portion of the arrangement position information corresponding to the image data for printing from the analysis result information assigned to the own devices to generate the respective response packets together with the image data for printing. Next, the image generation server devices 31A to 31C transmit the response packets to the print device 22 having the IP address and port number as the return destination described in the analysis result information. For example, the image generation server device 31A extracts the job number, the PPML page number, and the object number from the analysis result information illustrated in FIG. 16 as the corresponding arrangement position information. Next, the image generation server device 31A transmits the image data for printing illustrated in FIG. 17 and the corresponding arrangement position information to the print device 22.

(Step S106)

The print device 22 generates a page image. More specifically, the print device 22 collects the image date for printing received from the image generation server devices 31A to 31C and the corresponding arrangement position information and synthesizes the image for printing in units of pages based on the analysis result information to generate the page image.

For example, the print device 22 can specify the object corresponding to the image data for printing from the arrangement position information with reference to the analysis result information illustrated in FIG. 15 and can synthesize the page image based on the arrangement position of the object in the PPML page. In addition, when the image data for printing of all the objects constituting the one PPML page are prepared, it may be denoted that the page image of the associated page is generated.

(Step S107)

The print device 22 sequentially prints the generated page images on the paper medium.

In this manner, in the print system 1 according to the first embodiment, the print device 22 side analyzes the print job to generate the analysis result information, and the image generation server devices 31A to 31C side perform the RIP process based on the analysis result information by using the image generating function required for each object to generate the image for printing. Next, in turn, the print device 22 side synthesizes the image data for printing of each object into the page image and prints the page image.

Therefore, in the print system 1 according to the first embodiment, since it is possible to optimize the RIP process in response to a quality required for the print job, it is possible to reduce the total process time of printing.

Hereinafter, the analysis result information generating process of step S101 according to the first embodiment will be described in detail with reference to FIG. 18.

(Step S200)

The print device 22 provides the job number to the acquired print job. More specifically, the print device 22 provides the job number for designating the print job to the acquired print job. For this reason, in the case of consecutively printing plural print jobs, there occurs correspondence between the generated page images and the print jobs belonging to the page images. For example, the print device 22 provides the job number 60 to the print job illustrated in FIG. 14.

(Step S201)

The print device 22 acquires the arrangement position information of each object with reference to the PPML data. More specifically, the print device 22 acquires the PPML page number, the object number, the PDF page number, the cutting-out rectangle information, and the arrangement position in the PPML page from the PPML data as the arrangement position information of each object from the PPML data. For example, the print device 22 acquires the arrangement position information of the seven objects 71 to 77 from the PPML data of the print job for obtaining the printed matter illustrated in FIG. 14.

(Step S202)

The print device 22 selects one object among the constituent objects of the print job and acquires the print setting for the object. More specifically, the print device 22 selects one object among the objects of which arrangement position information is acquired in the process illustrated in step S201, and acquires the print setting for the object from the PDF data corresponding to the object. For example, the print device 22 selects any one of the object 71 to 77 illustrated in FIG. 14 and acquires the print setting from the PDF data of the object.

(Step S203)

The print device 22 determines whether or not the print setting for the object is designated as monochrome. More specifically, the print device 22 determines whether or not a color attribute of the object retained in the PDF data corresponding to the selected object is designated as grayscale color space. In addition, the present invention is not limited thereto, but the print device 22 can, for example, determine from the PDF data corresponding to the selected object whether or not all the pixels of the object has values on the grayscale. When the color attribute of the object is designated as grayscale color space, or when all the pixels have values on the grayscale, the print device 22 determines that the print setting is designated as monochrome. Otherwise, the print device 22 determines that the print setting is not designated as monochrome.

In the case where the print setting for the object is designated as monochrome (Yes in step S203), the print device 22 proceeds to the process in step S204. On the other hand, in the case where the print setting for the object is not designated as monochrome (No in step S203), the print device 22 proceeds to the process in step S205.

(Step S204)

The print device 22 determines the image generating function required for the object to be "monochrome" and temporarily stores the determination result in the memory 224 or the like. For example, the print device 22 determines the image generating function required for the objects 71, 72, and 73 illustrated in FIG. 14 which are variable character data edited in signal black color to be "monochrome".

(Step S205)

The print device 22 determines whether or not the print setting for the object is designated as "presence-of-transparence-effect". More specifically, the print device 22 determines whether or not the opacity attribute of the object retained in the PDF data corresponding to the selected object is designated as 100%. In addition, the present invention is not limited thereto, but the print device 22 can, for example, determines from the arrangement position information or the like of the selected object whether or not the object overlaps other objects. When the opacity attribute of the object is not designated as 100% and when the object overlaps other objects, the print device 22 determines that the print setting is designated as "presence-of-transparence-effect". Otherwise, the print device 22 determines that the print setting is not designated as "presence-of-transparence-effect".

In the case where the print setting for the object is designated as "presence-of-transparence-effect" (Yes in step S205), the print device 22 proceeds to the process in step S206. On the other hand, in the case where the print setting for the object is not designated as "presence-of-transparence-effect" (No in step S205), the print device 22 proceeds to the process in step S207.

(Step S206)

The print device 22 determines that the image generating function required for the object to be "color/presence-of-transparence-effect" and temporarily stores the determination result in the memory 224 or the like. For example, the print device 22 determines the image generating function required for the object 75 illustrated in FIG. 14 which is character data edited with a certain opacity (for example, 50%) in color to be "color/presence-of-transparence-effect".

(Step S207)

The print device 22 determines the image generating function required for the object to be "color/absence-of-transparence-effect" and temporarily stores the determination result in the memory 224 or the like. For example, the print device 22 determines the image generating functions required for the objects 74, 76, and 77 illustrated in FIG. 14 which are edited with an opacity of 100% in color to be "color/absence-of-transparence-effect".

(Step S208)

The print device 22 determines whether or not there is an unanalyzed object. More specifically, the print device 22 stores the number of acquired objects acquired in step S201 and counts the number of objects of which required image generating functions are determined, and determines by matching the counted number with the number of acquired objects whether or not there is an unanalyzed object.

When there is an unanalyzed object (Yes in Step S208), the print device 22 proceeds to the process in step S202. When there is no unanalyzed object (No in step S208), the print device 22 proceeds to the process in step S209.

(Step S209)

The print device 22 generates the analysis result information. More specifically, the print device 22 reads the determination result of each temporarily-stored image generating function required for the object and generates the analysis result information by making correspondence to the arrangement position information or the like of each object acquired in step S201 and adding the IP address information of the own device.

According to the operations described heretofore, the print device 22 can generate the analysis result information illustrated in FIG. 15 with respect to the print job for obtaining the printed matter illustrated in FIG. 14.

In the print system 1 according to the first embodiment, the print device 22 side analyzes the print job, and the image generation server devices 31A to 31C side generate the image for printing. In turn, the print device 22 side synthesizes the image for printing into the page image to generate the page image and prints the page image. However, the present invention is not limited thereto. For example, the print device 22 side may perform only the transmission of the print job and the printing of the page image, and the image generation server device 31 side may perform the analysis of the print job, the generation of the image for printing, and the generation of the page image. In this case, the images for printing generated from the respective slave image generation server devices 31A and 31C are not directly transmitted to the print device 22, but the images are returned to the master image generation server device 31B. Next, the master image generation server device synthesizes the page image and transmits the page image to the print device 22. Therefore, it is possible to further reduce the process load of the print device 22 side, and it is possible to reduce the total process time of the printing by applying the image generation service of the high-performance image generation server system 3.

In addition, in the first embodiment, the print device 22 receives the print job from the client terminal device 21. However, the present invention is not limited thereto, but the print job can be acquired by directly reading the recording medium such as a USB.

[Second Embodiment]

In the above-described print system 1 according to the first embodiment, the page images are printed in the order of generation thereof. In the second embodiment, in the case where there are plural print jobs, the page images are printed based on a page mixture treatment policy which does not allow the page images between the print jobs to be physically mixed.

The basic configuration of the print system 2 according to the second embodiment is the same as that of the first embodiment. Therefore, hereinafter only the operations of the print system 2 which are different from those of the first embodiment will be described.

<Operations of Print System>

Figure 19:
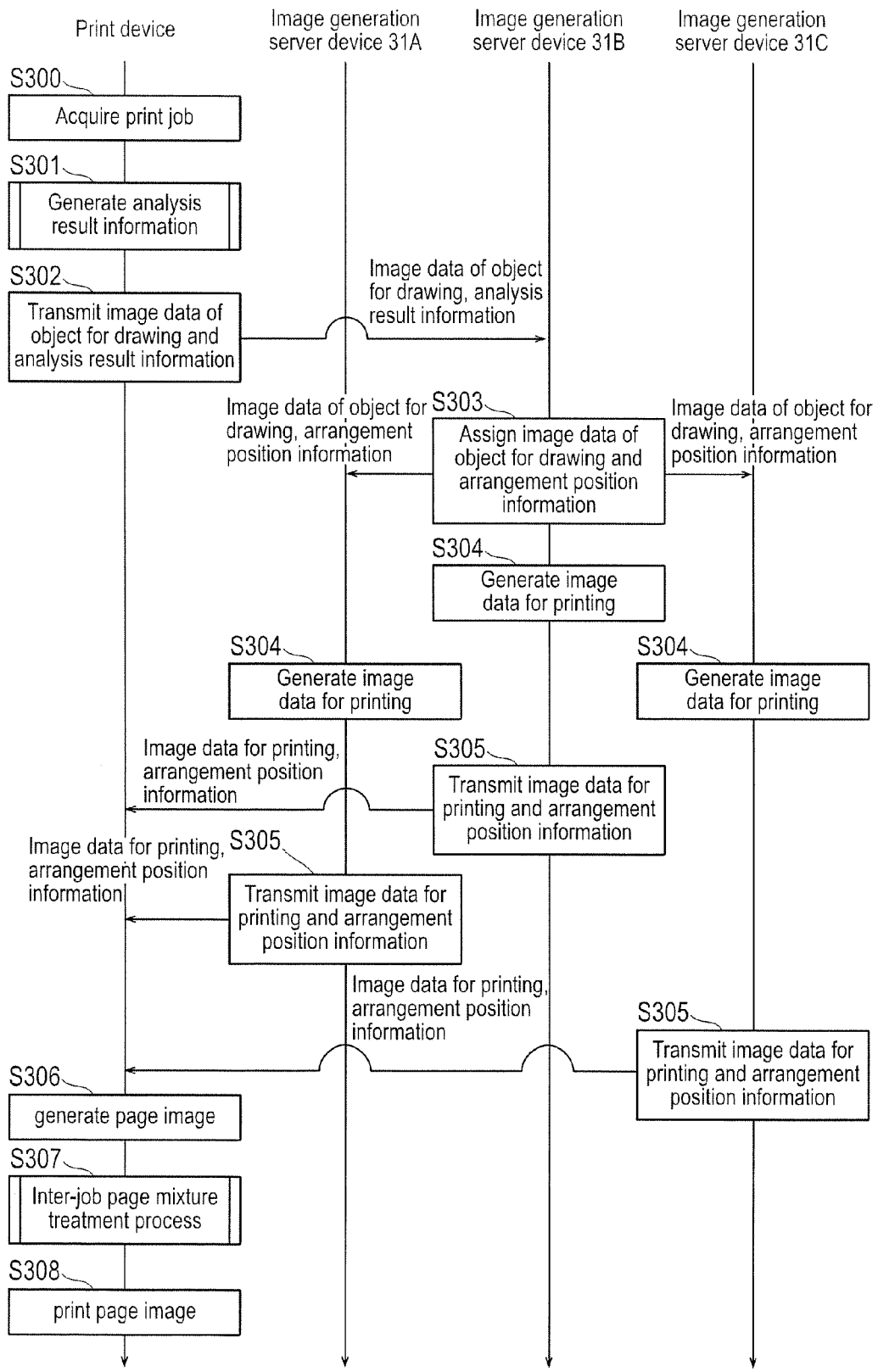
FIG. 19 is a sequence diagram for explaining operations of a print system according to a second embodiment.
Figure 20:
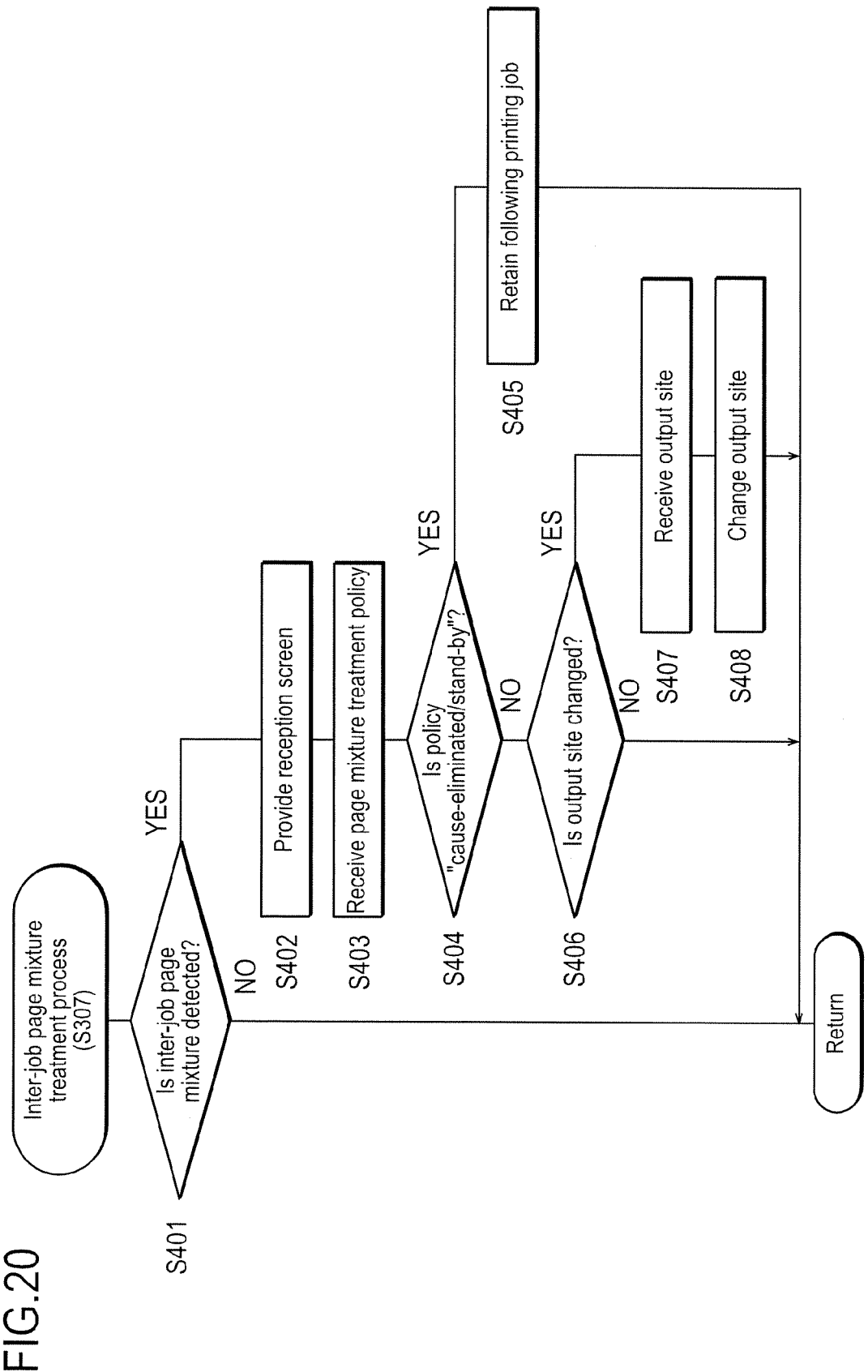
FIG. 20 is a flowchart illustrating an example of a specific process procedure of an inter-job page mixture treatment process of FIG. 19.
Figures 21, 22:
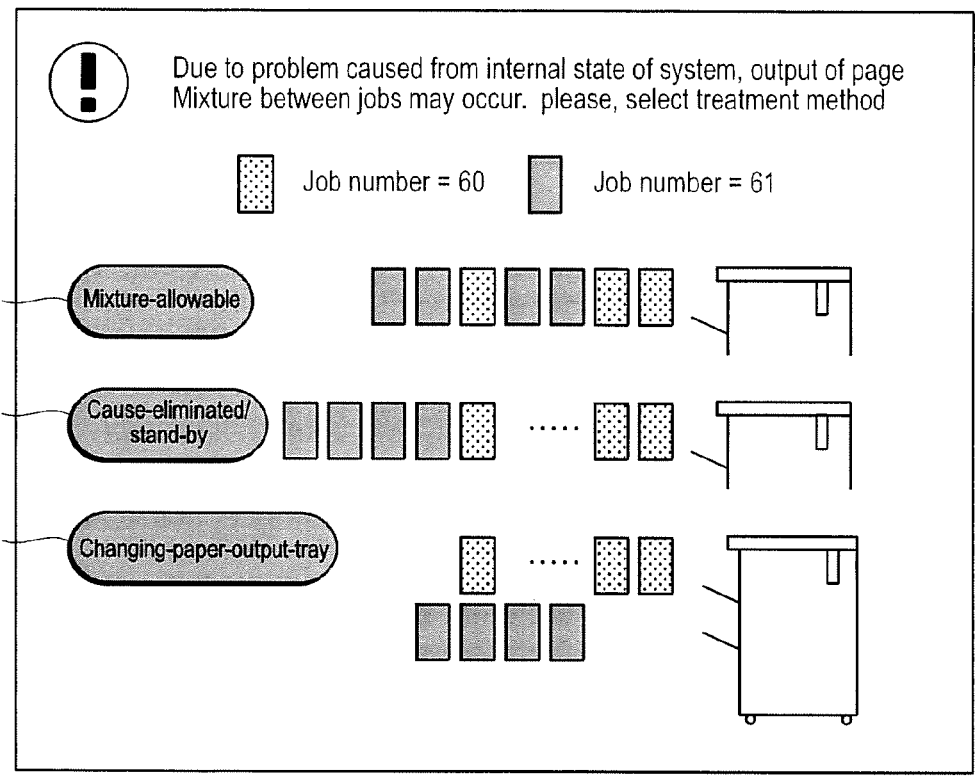
FIG. 21 is a diagram illustrating an example of a reception screen provided to receive an inter-job page mixture treatment policy.
FIG. 22 is a diagram illustrating an example of a reception screen provided to receive designation of an output destination.

FIG. 19 is a sequence diagram for explaining operations of the print system according to the second embodiment. FIG. 20 is a flowchart illustrating an example of a specific process procedure of an inter-job page mixture treatment process of FIG. 19. FIG. 21 is a diagram illustrating an example of a reception screen provided to receive the inter-job page mixture treatment policy. FIG. 22 is a diagram illustrating an example of a reception screen provided to receive designation of an output destination.

As illustrated in FIG. 19, the operations of the print system 2 according to the second embodiment is different from the operations of the print system 1 according to the first embodiment in that a process illustrated in step S307 is added. More specifically, contents of the processes illustrated in steps S300 to S306 according to the second embodiment are substantially the same as the processes illustrated in steps S100 to S106 of FIG. 13 according to the first embodiment.

However, in the second embodiment, plural print jobs are assumed to be processed. In the embodiment, the plural print jobs are set to be provided with job numbers in the ascending (increment) order acquired in step S300. In this case, in steps S301 and S302, the print jobs are processed in the number of the job numbers. However, after step S303, in some cases, the assigned image generation server device 31 may be different according to the jobs. In addition, the time taken for the process of the image generation server device 31 generating the image data for printing is also changed according to the type or size of the object.

Therefore, before the page image generation of step S306 with respect to all the pages of the preceding print jobs is ended, at the starting time of step S301, a portion of or the entire page images of the following print jobs which are to be processed later may be generated. Hereinafter, in this manner, the preceding and following of the generation of the page images between the different print jobs are referred to as inter-job page mixture.

The second embodiment relates to treatment (inter-job page mixture treatment process) when the inter-job page mixture occurs.

Hereinafter, the description of the processes of the second embodiment which are the same as the above-described processes of the first embodiment will be omitted.

(Step S307)

Subsequently to the process illustrated in step S306, the print device 22 performs the inter-job page mixture treatment process. Hereinafter, the details of the inter-job page mixture treatment process will be described with reference to FIG. 20.

(Step S401)

The print device 22 determines whether or not the inter-job page mixture is detected. More specifically, the print device 22 determines whether or not the page image of the following print job which is analyzed later in the process of step S301 is generated when the page image of the preceding print job which is previously analyzed in the process of step S301 illustrated in FIG. 19 is generated. For example, when the job number of the print job including the page image generated in the process of step S306 illustrated in FIG. 19 is larger than the job number of the print job belonging to the page image generated just before, the print device 22 determines that the inter-job page mixture is detected.

In the case where the inter-job page mixture is not detected (No in step S401), the print device 22 proceeds to the process in step S308 to print the page image. On the other hand, in the case where the inter-job page mixture is detected (Yes in step S401), the print device 22 proceeds to the process in step S402.

(Step S402)

The print device 22 provides a reception screen for receiving the designation of the inter-job page mixture treatment policy. The print device 22 can provide a reception screen illustrated in FIG. 21 through, for example, an operation panel (not illustrated).

For example, as illustrated in FIG. 21, on the reception screen, as the page mixture treatment policies, "mixture-allowable", "cause-eliminated/stand-by", and "changing-paper-output-tray" are provided, and buttons 81 to 83 corresponding to the page mixture treatment policies are prepared on the reception screen so that the user can specify the page mixture treatment policy. The user can specify the page mixture treatment policy in the operation panel. In addition, on the exemplified reception screen, as the job numbers where the page mixture is detected, the job number 60 and the job number 61 are displayed.

(Step S403)

The print device 22 receives the page mixture treatment policy specified from the user.

(Step S404)

The print device 22 determines whether or not the page mixture treatment policy is "cause-eliminated/stand-by". For example, when the designation of "cause-eliminated/stand-by" is received from the user through the reception screen illustrated in FIG. 21, the print device 22 determines that the page mixture treatment policy is "cause-eliminated/stand-by".

In the case where the page mixture treatment policy is "cause-eliminated/stand-by" (Yes in step S404), the print device 22 proceeds to the process in step S405. On the other hand, in the case where the page mixture treatment policy is not "cause-eliminated/stand-by" (No in step S404), the print device 22 proceeds to the process in step S406.

(Step S405)

The print device 22 temporarily retains the following print job in the memory 224 or the HDD 227. After that, the print device 22 proceeds to the process in step S308 to finish printing the page image of the preceding print job and to read the page image of the following print job temporarily retained and perform printing. Therefore, even in the case where the change of the output destination of the following printing job is intended to be avoided due to the circumstance of the finishing process or the like, it is possible to solve the physical page mixture between the jobs.

(Step S406)

The print device 22 determines whether or not the page mixture treatment policy is "changing-output-destination". For example, when the print device 22 receives designation of "change of paper-output tray" from the user in the reception screen illustrated in FIG. 21, the print device 22 determines that the page mixture treatment policy is "changing-output-destination".

In the case where the page mixture treatment policy is not "changing-output-destination" (No in step S406), the print device 22 determines that the page mixture treatment policy is "mixture-allowable". After that, the print device 22 proceeds to the process in step S308 to perform printing in the order of generation of the page images.

On the other hand, in the case where the page mixture treatment policy is "changing-output-destination" (Yes in step S406), the print device 22 proceeds to the process in step S407.

(Step S407)

The print device 22 receives the output destination specified by the user. For example, the print device 22 provides the reception screen illustrated in FIG. 22 and receives the designation of the tray of the output destination from the user.

For example, as illustrated in FIG. 22, on the reception screen, as the output destinations, "standard paper-output tray", "secondary paper-output tray", and a plurality of number-specifiable "output bins" are provided, and buttons corresponding to the output destinations are prepared on the reception screen so that the user can specify the output destination. The user can specify the output destination in the operation panel. In addition, in the case where the output destination of the preceding print job is the "standard paper-output tray", as illustrated in FIG. 22, the change of the output destination of the following print job can make the designation of the "standard paper-output tray" not allowable so that the output destination of the following print job is different from the output destination of the preceding print job.

(Step S408)

The print device 22 changes the output destination of the following print job into the output destination received from the user. After that, the print device 22 proceeds to the process in step S308 to print the preceding print job and the following print job in different output destinations in the order of generation of pages. Therefore, it is possible to solve the physical inter-job page mixture and to avoid the processing delay of the following print job.

In the print system 2 according to the second embodiment, in the case where there are the plural print jobs, although inversion of page generation images occurs between the print jobs, the page images belonging to the print jobs can be printed on the paper medium so that the page images are not physically mixed. Therefore, since the printed matters after the output do not need to be distinguished manually for each job, the convenience for the user is improved.

Figure 23:
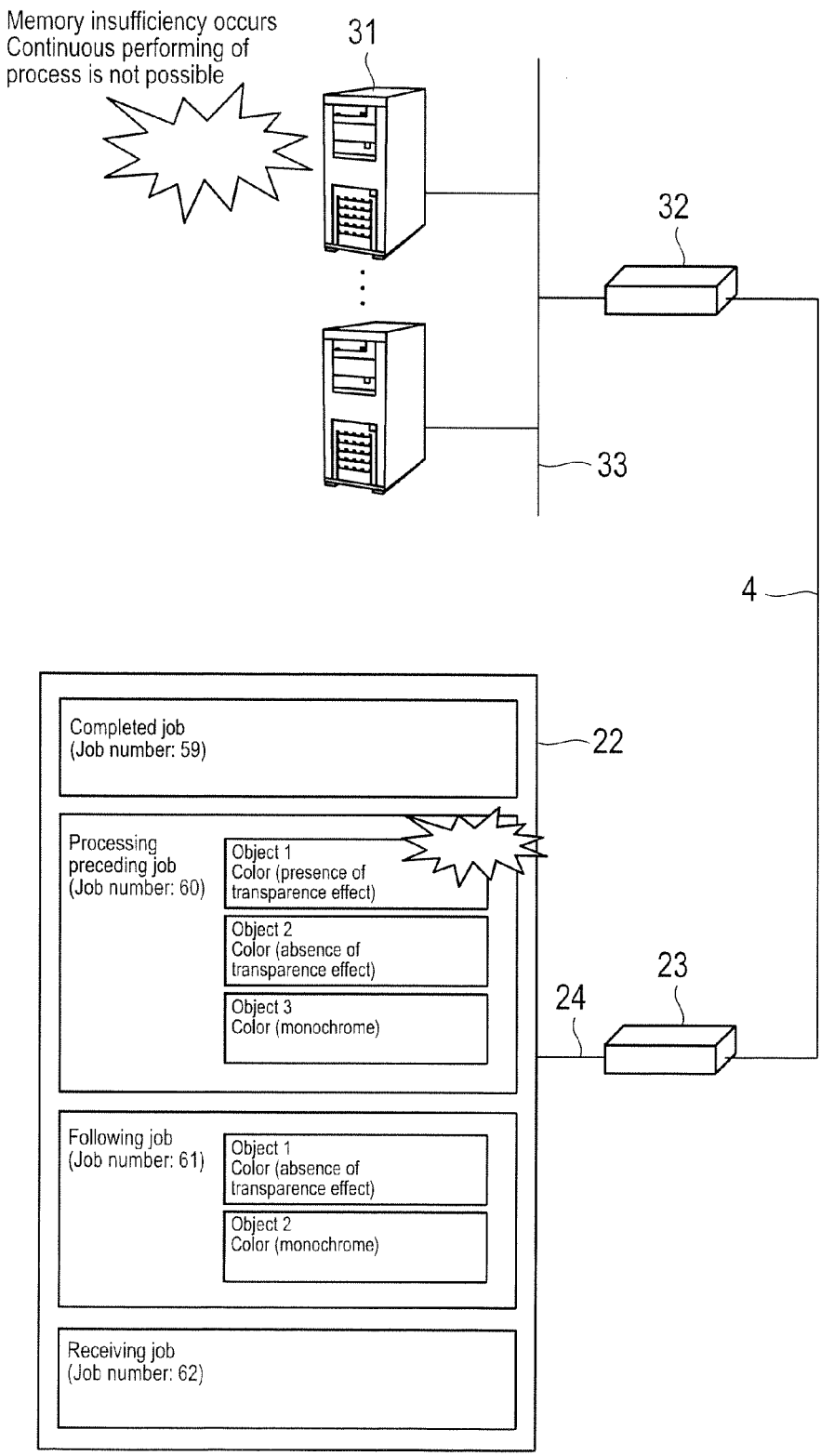
FIG. 23 is an explanation diagram for explaining an example of a state of occurrence of inter-job page mixture.

FIG. 23 is an explanation diagram for explaining an example of a state of occurrence of inter-job page mixture. FIG. 24 is a diagram illustrating an example of a state of progress of processes of each print job in the case where the inter-job page mixture occurs.

Firstly, as illustrated in FIG. 23, four print jobs exist in the print device 22. Among the print jobs, the print job of which job number is 59 is a completed job of which printing of the page image is completed, and the print job of which job number is 62 is a receiving job which is not yet completely received. In addition, the print jobs of which job numbers are 60 and 61 are processing jobs which are generating the images for printing by the image generation server device 31.

Herein, the print job of which job number is 60 is a preceding print job and includes three types of objects requiring the image generating functions of "color/presence-of-transparence-effect", "color/absence-of-transparence-effect", and "monochrome". On the other hand, the print job of which job number is 61 is a following print job and includes two types of objects requiring the image generating functions of "color/absence-of-transparence-effect" and "monochrome". In addition, the image generation server device 31C has the image generating function of "color/presence-of-transparence-effect".

Generally, the print device 22 transmits the preceding print job and the following print job in this order through the inter-network connection devices 23 and 32 via the network 24, the Internet 4, and the network 33 to the image generation server device 31. Therefore, the print device 22 receives images for printing belonging to the respective print jobs in the order of the preceding print job and the following print job from the image generation server device 31.

Herein, with respect to the RIP process time taken for generating the image for printing of one object and the used memory capacity, generally, the object requiring a relatively complicated RIP process takes a longer time and uses a larger memory than the object requiring a relatively simple RIP process. For example, the RIP process of the object of "color/presence-of-transparence-effect" takes a longer time and uses a larger memory than the RIP process of the object of "monochrome" or "color/absence-of-transparence-effect".

Therefore, for example, in the case where the levels of the hardware performance of the respective image generation server devices 31 are the same, memory insufficiency in the image generation server device 31C easily occurs in comparison with the other image generation server devices 31, and the state where the RIP process may not be continuously performed may temporarily occur. Therefore, when the image generation server device 31C generates the image for printing of the preceding job of which job number is 60, the state where the other image generation server devices 31 generates the image for printing of the following print job of which job number is 61 and transmits the image for printing to the print device 22 may occur.

In the print device 22, when the page image belonging to the preceding print job is generated, the image data for printing for generating the page image belonging to the following print job are prepared, so that that state where the generation order of the page images belonging to the preceding print job and the following print job is inverted occurs.

The print system 2 according to the above-described second embodiment is a print system that can print the pages included in the other print jobs on the paper medium without physical mixture although the inversion of the page generation images occurs between the print jobs.

In addition, in the case where the plural print jobs are printed based on the above-described page mixture treatment policies, the CPU 223 can display the information illustrated in FIG. 24 on the operation panel so that the state of progress of processes of each print job can be recognized.

The example of FIG. 24 is an example of the state of progress of processes in the case where inversion of the page image generation occurs between the print jobs of which job numbers are 60 and 61, and the user's designation "changing-paper-output-tray" and "secondary paper-output tray" on the reception screen illustrated in FIGS. 21 and 22 is received. As illustrated in FIG. 24, the column of the "paper-output tray" of the print job as a following print job of which job number is 61 is illustrated to be "standard tray secondary paper-output tray". In addition, both of the "states" of the print jobs of which job numbers are 60 and 61 are illustrated to be "printing". The user can recognize the occurrence of the page mixture and the output destination corresponding to the print job from this display.

In this manner, in the print system 2 according to the second embodiment, when the page mixture occurs among the plural print jobs, the page image is printed based on the page mixture treatment policy. Therefore, in the print system 2 according to the second embodiment, it is possible to solve the physical mixture of the pages included in different jobs.

In the second embodiment, the print device 22 provides the reception screen for receiving the page mixture treatment policy and the output destination by using the operation panel. However, the present invention is not limited thereto, but the reception screen may be provided via the network 24 by using a monitor or the like of the client terminal device 21.

In the second embodiment, the print device 22 provides the reception screen so that the page mixture treatment policy and the output destination can be designated when the inter-job page image generation is inverted. However, the present invention is not limited thereto, but the page mixture treatment policy may be provided as a system parameter in advance.

In the above-described first and second embodiments, the cases where the operations of the print device 22 and the operations of the image generation server device 31 are implemented by the programs executed on the computer are described. However, all the processes may not be implemented by programs executed on the computer, but a portion of the processes may be implemented by dedicated hardware circuits. In addition, the above-described programs may be provided by a computer-readable recording medium such as a flexible disk or a CD-ROM, or the above-described programs may be provided on-line via a network such as the Internet. In the former case, the programs recorded on the computer-readable recording medium are generally transmitted to a nonvolatile memory such as an Electronically Erasable Programmable Read-Only Memory (EEPROM) or a Hard Disk Drive (HDD).

Heretofore, very exemplary embodiments of the present invention are described. However, these are examples for explaining the present invention, and the scope of the present invention is not intended to be limited to the embodiments. The present invention can be embodied in various aspects different from the above-described embodiments without departing from the spirit of the invention.

What is claimed is:

1. A print system comprising:
   an analyzing unit which analyzes, from a print job including image data of plural objects for drawings and print setting, arrangement position information of each of the objects for drawing in a page belonging to the print job and an image generating function required for each object for drawing to generate analysis result information;
   a plurality of image generating units which has different image generating functions and is capable of generating image data for printing from the image data of the objects for drawing;
   an assigning unit which assigns the image data and the arrangement position information of the objects for drawing to the image generating units having the respective required image generating functions based on the analysis result information;
   a synthesizing unit which collects the plurality of pieces of image data for printing generated in the plurality of image generating units and the corresponding arrangement position information and synthesizes the image data for printing in units of pages based on the analysis result information to generate a page image; and
   a printing unit which prints the page image.

2. The print system as claimed in claim 1,
   wherein there are the plural print jobs, and
   wherein, when the synthesizing unit generates the page image belonging to a preceding print job which is previously analyzed by the analyzing unit, in the case where the image data for printing for generating the page image belonging to a following print job which is analyzed later by the analyzing unit are prepared in the synthesizing unit, the printing unit prints the page image based on a page mixture treatment policy representing that the page image belonging to the preceding print job and the page image belonging to the following print job are not to be physically mixed,
   wherein image data for printing associated with the preceding print job is different from the image data for printing associated with the following print job.

3. The print system as claimed in claim 2, wherein the page mixture treatment policy represents that, after all the page images belonging to the preceding print job are printed, the page image belonging to the following print job is to be printed.

4. The print system as claimed in claim 2,
   wherein the printing unit includes a plurality of output destinations, and
   wherein the page mixture treatment policy represents that the page images are to be printed and output to the different output destinations according to the different print jobs.

5. The print system as claimed in claim 2, wherein a reception screen for receiving designation of the page mixture treatment policy is provided.

6. The print system as claimed in claim 1, comprising:
   a print device which acquires the print job; and
   an image generation server device which is able to mutually communicate with the print device,
   wherein the print device includes the printing unit,
   wherein the image generation server device includes the assigning unit and the plural image generating units, and
   wherein the analyzing unit and the synthesizing unit are included in any one of the print device and the image generation server device.

7. The print system as claimed in claim 6,
   wherein there are the plural image generation server devices which are able to communicate with each other, and
   wherein the plural image generating units are included in the different image generation server devices.

8. A printing method comprising the steps of:
   (a) analyzing, from a print job including image data of plural objects for drawing and print setting, arrangement position information of each of the objects for drawing in a page belonging to the print job and an image generating function required for each object for drawing to generate analysis result information;
   (b) assigning the image data and the arrangement position information of the objects for drawing to image generating units having the respective required image generating functions among a plurality of the image generating units having the different image generating functions based on the analysis result information;
   (c) generating image data for printing from the image data of the object for drawing in the image generating unit;

(d) collecting the plurality of pieces of image data for printing and the corresponding arrangement position information and synthesizing the image data for printing in units of pages based on the analysis result information to generate a page image; and (e) printing the page image.

9. The print method as claimed in claim 8, wherein there are the plural print jobs, and wherein, when the page image belonging to a preceding print job which is previously analyzed in the step (a) is generated, in the case where image data for printing for generating the page image belonging to a following print job which is analyzed later in the step (a) is prepared, in the step (e), the page image is printed based on a page mixture treatment policy representing that the page image belonging to the preceding print job and the page image belonging to the following print job are not to be physically mixed, wherein image data for printing associated with the preceding print job is different from the image data for printing associated with the following print job.

10. The print method as claimed in claim 9, wherein the page mixture treatment policy represents that, after all the page images belonging to the preceding print job are printed, the page image belonging to the following print job is to be printed.

11. The print method as claimed in claim 9, wherein, in the step (e), the page image can be output to a plurality of output destinations, and wherein the page mixture treatment policy represents that the page images are to be printed and output to the different output sides according to the different print jobs.

12. The print method as claimed in claim 9, wherein a reception screen for receiving designation of the page mixture treatment policy is provided.

13. A non-transitory computer-readable recording medium storing a print program for causing a computer to execute a printing method, the printing method comprising the steps of:

(a) analyzing, from a print job including image data of plural objects for drawing and print setting, arrangement position information of each of the objects for drawing in a page belonging to the print job and an image generating function required for each object for drawing to generate analysis result information;

(b) assigning the image data and the arrangement position information of the objects for drawing to image generating units having the respective required image generating functions among a plurality of the image generating units having the different image generating functions based on the analysis result information;

(c) generating image data for printing from the image data of the object for drawing in the image generating unit;

(d) collecting the plurality of pieces of image data for printing and the corresponding arrangement position information and synthesizing the image data for printing in units of pages based on the analysis result information to generate a page image; and (e) printing the page image.

14. The non-transitory computer-readable recording medium as claimed in claim 13, wherein there are the plural print jobs, and wherein, when the page image belonging to a preceding print job which is previously analyzed in the step (a) is generated, in the case where image data for printing for generating the page image belonging to a following print job which is analyzed later in the step (a) is prepared, in the step (e), the page image is printed based on a page mixture treatment policy representing that the page image belonging to the preceding print job and the page image belonging to the following print job are not to be physically mixed, wherein image data for printing associated with the preceding print job is different from the image data for printing associated with the following print job.

15. The non-transitory computer-readable recording medium as claimed in claim 14, wherein the page mixture treatment policy represents that, after all the page images belonging to the preceding print job are printed, the page image belonging to the following print job is to be printed.

16. The non-transitory computer-readable recording medium as claimed in claim 14, wherein, in the step (e), the page image can be output to a plurality of output destinations, and wherein the page mixture treatment policy represents that the page images are to be printed and output to the different output destinations according to the different print jobs.

17. The non-transitory computer-readable recording medium as claimed in claim 14, wherein a reception screen for receiving designation of the page mixture treatment policy is provided.

\* \* \* \* \*